United States Patent
Inou

(10) Patent No.: US 6,639,647 B1
(45) Date of Patent: Oct. 28, 2003

(54) MANUFACTURING METHOD OF LIQUID CRYSTAL DISPLAY ELEMENT AND MANUFACTURING DEVICE FOR USE WITH THE SAME

(75) Inventor: Ippei Inou, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 246 days.

(21) Appl. No.: 09/735,847

(22) Filed: Dec. 13, 2000

(30) Foreign Application Priority Data

Dec. 14, 1999 (JP) .......................................... 11-354579
Nov. 1, 2000 (JP) ....................................... 2000-335156

(51) Int. Cl.[7] .......................................... G02F 1/1341
(52) U.S. Cl. ...................................... 349/189; 349/187
(58) Field of Search ................................. 349/188, 187, 349/189

(56) References Cited

U.S. PATENT DOCUMENTS 5,568,297 A * 10/1996 Tsubota et al.

FOREIGN PATENT DOCUMENTS

| JP | 60-170830 | 9/1985 |
| JP | 5-218174 | 8/1993 |
| JP | 6-93427 | 4/1994 |
| JP | 11-2825 | 1/1999 |
| JP | 11-287998 | 10/1999 |

* cited by examiner

Primary Examiner—Toan Ton
Assistant Examiner—Thoi V. Duong
(74) Attorney, Agent, or Firm—Edwards & Angell, LLP; David G. Conlin; J. Mark Konieczny

(57) ABSTRACT

A liquid crystal cell is moved into a vacuum oven. The heater power source of the vacuum oven is turned off and the chamber in the vacuum oven is evacuated to a degree of vacuum (vacuum condition) of about 100 Pa. Then, the liquid crystal cell is slowly cooled to, for example, 40° C. while maintaining that degree of vacuum (vacuum condition). Subsequently, nitrogen gas is substituted for the contents of the liquid crystal cell in a "nitrogen gas substitution" step, by introducing nitrogen gas to the chamber in the slow cooled vacuum oven and thereby restoring normal pressure. Thereafter, liquid crystal is charged to the liquid crystal cell, followed by an injection opening is sealed with a sealant, and ultraviolet light from which 330 nm or shorter wavelength light is projected to cure the sealant. A liquid crystal display element in accordance with the present invention is thus fabricated.

9 Claims, 12 Drawing Sheets

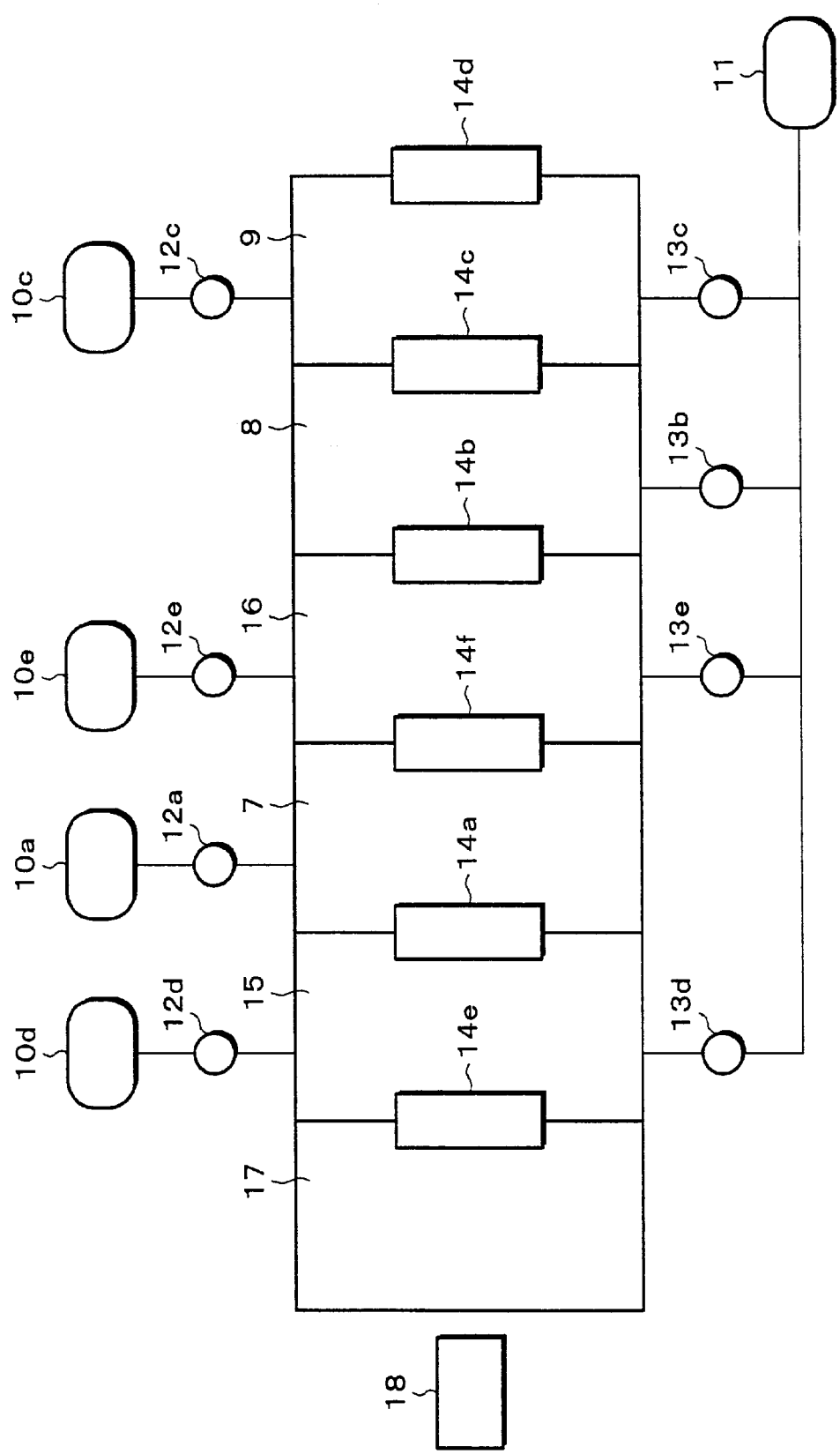

MANUFACTURING METHOD OF LIQUID CRYSTAL DISPLAY ELEMENT AND MANUFACTURING DEVICE FOR USE WITH THE SAME

FIELD OF THE INVENTION

The present invention relates to a manufacturing method of a liquid crystal display element with improved display quality as a result of prevention of decomposition or degradation of the liquid crystal, and also relates to a manufacturing device for use with the method.

BACKGROUND OF THE INVENTION

A typical liquid crystal display element is manufactured in the following manner. Transparent electrodes are formed on the inner sides of a pair of transparent substrates. Then the transparent substrates are subjected to an alignment process. Sealing material is applied around display areas of the transparent substrates. Using the sealing material, the substrates are subsequently combined to form a liquid crystal cell, with an injection opening being left open to allow the charging (injection) of liquid crystal through it. Liquid crystal is then charged in the liquid crystal cell through the injection opening. After the charging, the injection opening is closed using a sealant made of a UV-curing resin composition. To finish the manufacture, ultraviolet light is projected to the sealant to cure it.

Various methods have been suggested to improve the display quality of a liquid crystal display element manufactured by the above manufacturing processes. For example, Japanese Laid-Open Patent Application No. 60-170830/1985 (Tokukaisho 60-170830; published on Sep. 4, 1985) discloses a method to manufacture a highly reliable liquid crystal display element by preventing the formation of foam inside the liquid crystal cell. According to the disclosure, the foam formation is prevented by a heating and evacuation process in which the liquid crystal cell, before being filled with liquid crystal, is heat-dried to remove residual water content inside the cell and evacuated to $10^{-6}$ Pa to $10^{-7}$ Pa ($10^{-5}$ Torr to $10^{-6}$ Torr).

More specifically, as shown in the flow chart of FIG. 6, in the "heating" step, the transparent substrate is heated at 130° C. using a vacuum oven or the like. Water content is then removed by evacuating the cell to about $10^{-6}$ Pa in the "evacuation" step. In the next step of "air introduction," the air is introduced into a chamber of the slowly cooled vacuum oven to restore normal pressure. The transparent substrate is removed from the chamber to form transparent electrodes on it in the "transparent electrode formation" step. A pair of transparent substrates are subjected to alignment, and sealing material is applied around the display areas of the pair of transparent substrates in the "liquid crystal cell fabrication" step. In the following step of "cutting," liquid crystal cells, which are formed as a single piece by combining the two substrates using the sealing material with an injection opening being left open to allow the charging of liquid crystal, are now cut into many individual cells or a cell cluster in which cells are lined up end to end.

In the "heating" step which immediately follows the cutting, the individual liquid crystal cell is heated at 130° C. using a vacuum oven. Water content is then removed by evacuating the cell to about $10^{-6}$ Pa in the "evacuation" step. In the next step of "air introduction," the air is introduced into a chamber of the slowly cooled vacuum oven to restore normal pressure. The liquid crystal cell is then removed from the chamber. Thereafter, liquid crystal is charged through the injection opening in the "injection" step. To complete the fabrication of the liquid crystal display element, the injection opening is sealed with a sealant, which is then exposed to ultraviolet light to cure in the "sealing" step.

When molecules in the liquid crystal absorb ultraviolet light in a particular wavelength region, they become optically excited and highly active, causing radical reactions and optical reactions. The excited liquid crystal molecules decompose or degrade (as a result of oxidization) due to interaction with the material composing the alignment film and reactions with foreign objects (for example, oxygen, water content, acid compounds such as nitrogen oxides and sulfur oxides, and gaseous and other molecules in solvents used in the manufacturing processes of the liquid crystal display element) that are found in the liquid crystal cell. To address these problems, for example, Japanese Laid-Open Patent Application No. 11-2825/1999 (Tokukaihei 11-2825; published on Jan. 6, 1999) discloses a method to manufacture a liquid crystal display device with excellent display quality through the prevention of decomposition and degradation of the injected liquid crystal. According to the disclosure, 300 nm or shorter wavelength light (electromagnetic waves) is removed from the ultraviolet light emitted from a light source, such as a high pressure mercury lamp or a metal halide lamp, and the remaining light is projected to cure the sealant.

A vacuum impregnation technique is typically used in the "injection" step described in the foregoing manufacturing processes of liquid crystal display element to charge liquid crystal to a liquid crystal cell. The device to implement such a vacuum impregnation technique is disclosed, for example, in Japanese Laid-Open Patent Application No. 11-287998/1999 (Tokukaihei 11-287998; published on Oct. 19, 1999). According to the disclosure, a liquid crystal injection device is constituted by three separate chambers: a preliminary heating chamber for performing preliminary heating on a liquid crystal cell, a preliminary defoam chamber for performing preliminary defoaming on liquid crystal, and a vacuum chamber. In the device, a liquid crystal cell and liquid crystal are introduced to the vacuum chamber after undergoing preliminary heating and preliminary defoaming respectively, so as to charge the liquid crystal to the liquid crystal cell.

However, according to the disclosure in Japanese Laid-Open Patent Application No. 60-170830/1985 mentioned earlier, the liquid crystal cell is heat-dried and evacuated before the depressurization is terminated to revert to normal pressure. Consequently, the air is allowed to enter the liquid crystal cell. Oxygen, water content, acid compounds such as nitrogen oxides and sulfur oxides including sulfurous compounds, and gaseous and other molecules in solvents used in the manufacturing processes of the liquid crystal display element, which are found in the air, are attracted to the alignment film inside the liquid crystal cell. The attracted molecules adversely affect the liquid crystal, causing it to change undesirably over time. The resultant liquid crystal display element fails to deliver a satisfactory level of display quality.

In addition, a general purpose vacuum pump is not powerful enough to evacuate the cell to $10^{-6}$ Pa to $10^{-7}$ Pa, i.e., is not sufficient to achieve an extremely high degree of vacuum. Therefore, performing steps in such a high degree of vacuum requires a special vacuum pump, such as a diffusion pump, turbo molecular pump, cryopump, or sputter ion pump, which is capable of creating an extremely high degree of vacuum.

The concentration extinction coefficient k of a liquid crystal is given by the equation:

$$k=[\log(1/T)]/C$$

where T is the light transmittance in percentage points (%) and C is the concentration in grams per liter (g/L). FIG. 7 shows that when the incident light wavelength exceeds about 330 nm (ultraviolet region of the spectrum), the concentration extinction coefficient k of a typical liquid crystal equals 0. Typical liquid crystal molecules have a light absorption threshold wavelength at about 330 nm; they absorb ultraviolet light in a 330 nm or shorter wavelength region and, in particular, absorb ultraviolet light in a 320 nm or shorter wavelength region extremely well. Meanwhile, the high pressure mercury lamp and the metal halide lamp, which provide popular light sources, emits ultraviolet light with a line spectrum at 313 nm. Therefore, the method disclosed in Japanese Laid-Open Patent Application No. 11-2825/1999 still falls short of completely removing ultraviolet light in such a wavelength region that prompts decomposition and degradation of liquid crystal, and causes the sealant to be exposed to light including UV light in an about 300 nm to about 330 nm wavelength region. With the manufacturing method disclosed in the Patent Application, the liquid crystal is adversely affected by ultraviolet light projected to the sealant to cure it, which results in decreases in the voltage retaining ratio. It is thus difficult to manufacture a liquid crystal display device with excellent display quality.

If the liquid crystal interposed between electrodes degrades, an electric current flows through the liquid crystal from one electrode to the other. The electric flow reduces the voltage retaining ratio and makes it impossible to keep a voltage level across the electrodes which is required to cause liquid crystal to produce electro-optical effects. The liquid crystal display element cannot be turned on in these circumstances. Especially, if only a particular part of the liquid crystal cell is exposed to ultraviolet light, the voltage retaining ratio drops there, and the liquid crystal display element displays an image with burns.

Commercially available ultraviolet ray filters made of glass are used very often to obstruct the ultraviolet light which is intended to cure the sealant from being projected to the liquid crystal, and eventually, to prevent deficient displays detailed above. To mass produce liquid crystal display elements, liquid crystal needs to be charged to many liquid crystal cells at a time, as well as the sealant applied to those many cells needs to be cured collectively. To implement this, ultraviolet light inevitably needs to be emitted to cover a large area in a single projection. Problems lie where a glass-made ultraviolet ray filter covering a large area is costly and likely to be damaged by an impact, for example. Therefore, it is not desirable from an industrial point of view to use a filter to prevent the liquid crystal display element from developing display deficiencies.

In the device disclosed in Japanese Laid-Open Patent Application No. 11-287998/1999, water content and various solvent gas molecules are attracted and stick to the surface of the alignment film in the liquid crystal cell during its manufacture, which can be only insufficiently removed. The attracted molecules adversely affect the liquid crystal, causing it to change undesirably over time. The resultant liquid crystal display element fails to produce a uniform display and fails to deliver a satisfactory level of display quality.

SUMMARY OF THE INVENTION

An objective of the invention of the present invention is to present a method and a manufacturing device used with the method, whereby the voltage retaining ratio of the liquid crystal is kept unchanged through the prevention of decomposition or degradation of the liquid crystal, and a liquid crystal display element is thereby manufactured with improved display quality.

To achieve the objective, a manufacturing method of a liquid crystal display element in accordance with the present invention, including the sequential steps of:

(1) evacuating a liquid crystal cell by means of depressurization;

(2) substituting an inert gas for contents of the liquid crystal cell; and (3) charging liquid crystal to the liquid crystal cell.

With the arrangement, foreign objects (for example, oxygen, water content, acid compounds such as nitrogen oxides and sulfur oxides, and gaseous and other molecules in solvents used in the manufacturing processes of the liquid crystal display element) are removed from the interior of the liquid crystal cell, and there is no risk of the air being charged in the liquid crystal cell. Therefore, there is no risk of the liquid crystal charged in the liquid crystal cell degrading due to adverse effects of the foreign objects. Accordingly, the voltage retaining ratio is kept unchanged in the liquid crystal. A liquid crystal display element is thus manufactured with improved display quality. Further, since an inert gas is substituted for the contents of the liquid crystal cell. So, a specialized vacuum pump (such as the one dedicated to create an extremely high degree of vacuum) is no longer necessarily used in the evacuation of the liquid crystal cell. A general purpose vacuum pump serves the purpose sufficiently. This further facilitates the manufacture of the liquid crystal display element.

To achieve the objective, a manufacturing device of a liquid crystal display element in accordance with the present invention includes:

a depressurization device for depressurizing a liquid crystal cell;

an inert gas substitution device for substituting an inert gas for contents of the liquid crystal cell; and a liquid crystal charging device for charging liquid crystal in the liquid crystal cell, the three devices being lined in this order with no intervening members.

With the arrangement, foreign objects (for example, oxygen, water content, acid compounds such as nitrogen oxides and sulfur oxides, and gaseous and other molecules in solvents used in the manufacturing processes of the liquid crystal display element) are removed from the interior of the liquid crystal cell, and there is no risk of the air being charged in the liquid crystal cell. Therefore, there is no risk of the liquid crystal charged in the liquid crystal cell degrading due to adverse effects of the foreign objects. Accordingly, the voltage retaining ratio is kept unchanged in the liquid crystal. A manufacturing device is thus realized which is capable of manufacturing a liquid crystal display element with improved display quality. Further, since an inert gas is substituted for the contents of the liquid crystal cell. So, a specialized vacuum pump (such as the one dedicated to create an extremely high degree of vacuum) is no longer necessarily used in the evacuation of the liquid crystal cell. A general purpose vacuum pump serves the purpose sufficiently. This further facilitates the manufacture of the liquid crystal display element. In addition, since the three devices are lined with no intervening members, steps can be implemented without a break from the evacuation of the liquid crystal cell to the charging of liquid crystal in the liquid crystal cell.

The present invention will become more fully understood from the detailed description given hereinbelow and the accompanying drawings which are given by way of illustration only, are not in any way intended to limit the scope of the claims of the present invention.

BRIEF DESCRIPTION OF THE DRAWINGS

FIG. 12 is a block diagram schematically showing a manufacturing device of a liquid crystal display element in accordance with yet another embodiment of the present invention.

DESCRIPTION OF THE EMBODIMENTS

[Embodiment 1]

Figure 1:
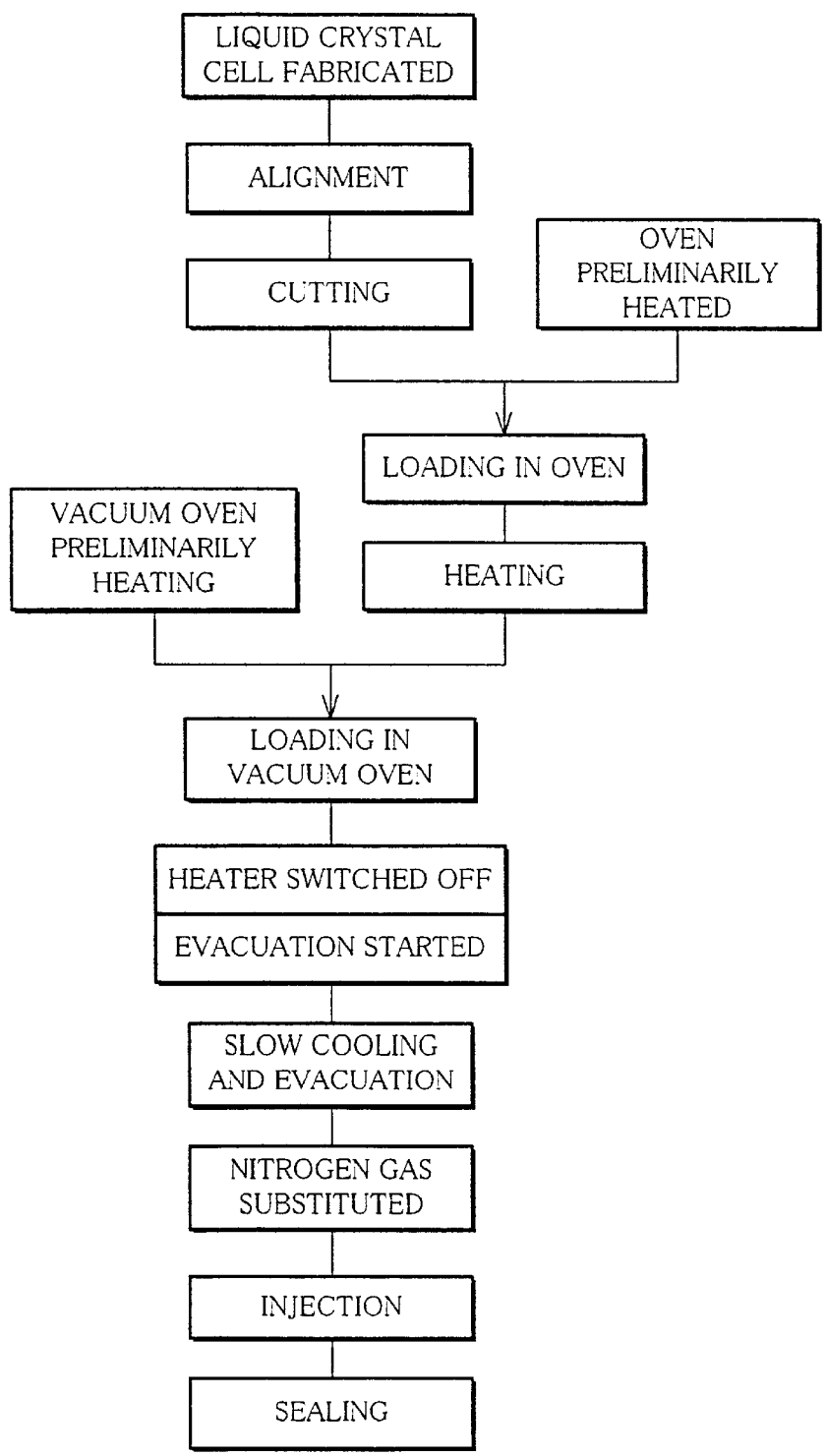
FIG. 1 is a flow chart showing manufacturing processes of a liquid crystal display element in accordance with an embodiment of the present invention.
Figure 2:
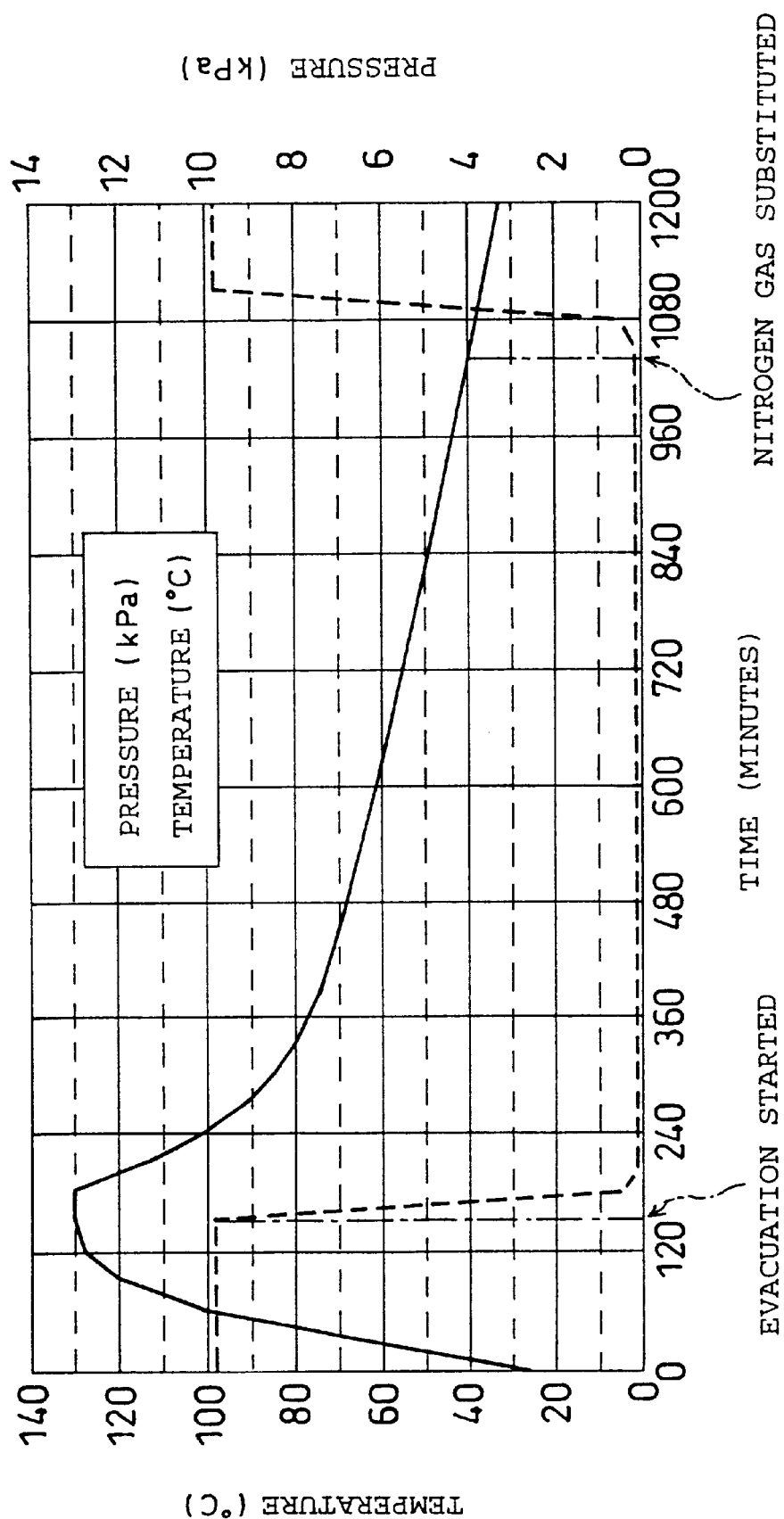
FIG. 2 is a graph showing, as an example, temperature and pressure changes in a chamber of a vacuum oven in the "evacuation starting" step and the "nitrogen gas substituting" step the foregoing flow chart.
Figure 3:
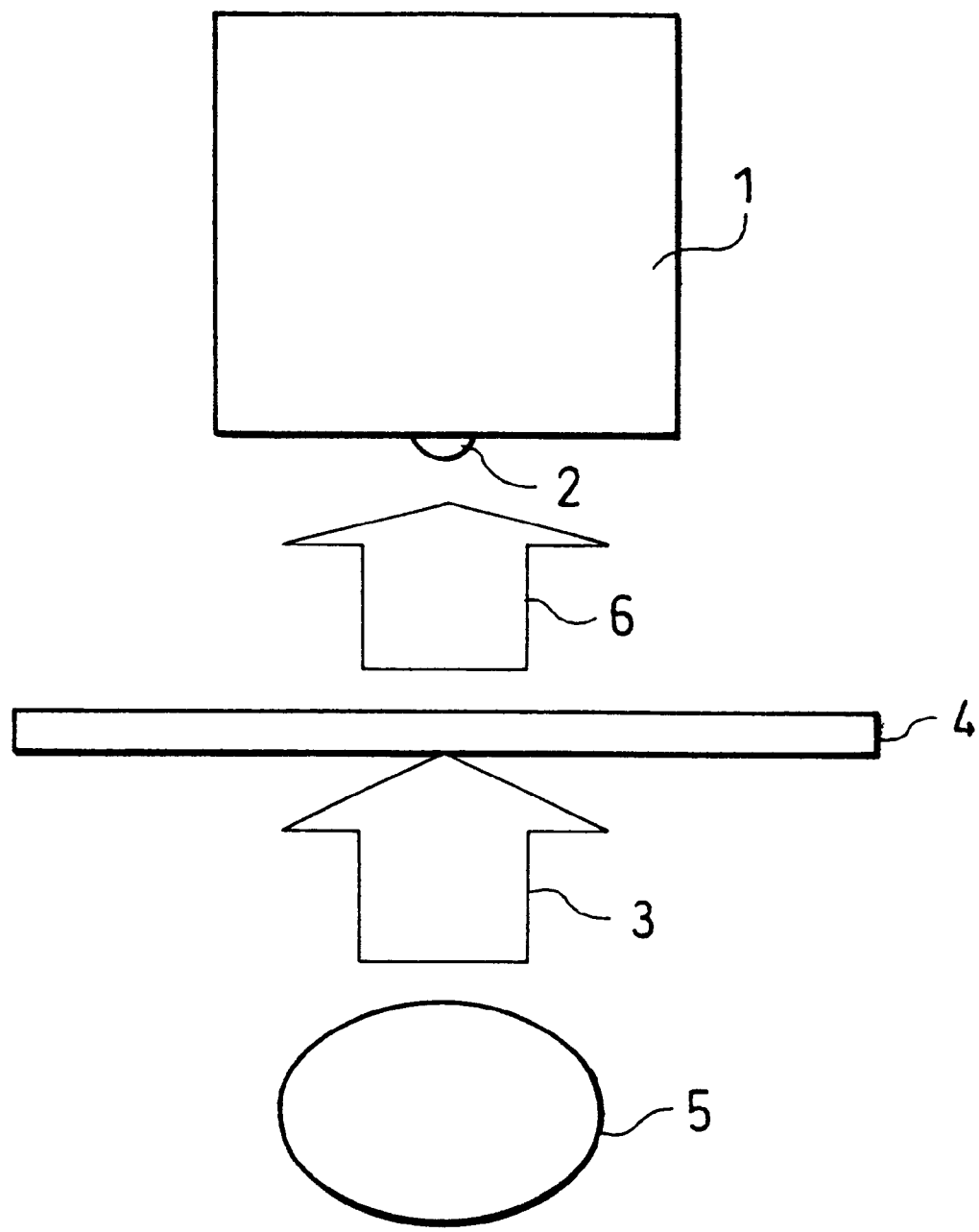
FIG. 3 is a block diagram showing a configuration of a light source, a filter, and other components used in the "sealing" step in the flow chart.

The following description will discuss an embodiment of the present invention in reference to FIG. 1 to FIG. 3.

According to a manufacturing method of a liquid crystal display element in accordance with the present invention, the liquid crystal cell is evacuated by means of depressurization, the inert gas is then substituted for the remaining contents of the liquid crystal cell, and finally the liquid crystal charged to the liquid crystal cell. Preferably, the evacuation by means of depressurization accompanies the heating of the interior of the liquid crystal cell. According to another manufacturing method of a liquid crystal display element in accordance with the present invention, the liquid crystal cell into which the liquid crystal is charged is sealed by a UV-curing sealant, and then ultraviolet light from which 330 nm or shorter wavelength light is removed is projected to cure the sealant.

There are no particular limitations on the aforementioned liquid crystal cell and liquid crystal; they can be a liquid crystal cell and a liquid crystal (liquid crystal composition) which have been used in liquid crystal display elements conventionally. Further, the liquid crystal can be charged into the liquid crystal cell by a method used conventionally in the manufacture of liquid crystal display elements.

A suitable heating temperature for the liquid crystal cell is in a range of from 100° C. to 150° C. Temperatures about 130° C. are most suitable. The substrate of the liquid crystal cell is typically made of a plastic sheet or film of polycarbonate, a crosslinking heat resistant acrylic resin, polyether sulfone, an epoxy resin, or cyclic polyolefin. The liquid crystal cell fabricated on a plastic substrate has almost no risk of being damaged and requires no extra care when it is heated, evacuated, or subjected to another process, which further facilitates the manufacture of the liquid crystal display element. Normal baking and curing temperatures for the alignment film, the sealing material, and the like, formed on the substrate surface are about 150° C. If the liquid crystal cell is heated at a temperature higher than 150° C., the alignment film, the sealing material, etc. may be heated above a suitable baking or curing temperature, in which case the liquid crystal display element possibly lose its required characteristics. In contrast, if the liquid crystal cell is heated at a temperature lower than 100° C., water content and other foreign objects remaining in the liquid crystal cell may not be sufficiently removed. The liquid crystal cell is heated several hours, preferably around two hours; however, there are no particular limitations on the duration of heating. Neither are there any particular limitations on the method by which liquid crystal cell is heated.

It is sufficient to evacuate the liquid crystal cell to about 100 Pa, since an inert gas will be substituted for the contents of the liquid crystal cell. This degree of vacuum (eventual degree of vacuum) can be achieved using a rotary pump or another general purpose vacuum pump. Evacuating the liquid crystal cell further than the 100 Pa level is not desirable, because such a high degree of vacuum requires the use of a special purpose vacuum pump (a dedicated type to achieve an extremely high degree of vacuum) or a vacuum oven with a specially designed chamber (will be detailed later). This degree of vacuum is maintained for several hours; however, there are no particular limitations on the duration of the evacuated condition. In the present invention, no special vacuum pump is required to evacuate the liquid crystal cell, and a general purpose vacuum pump serves the purpose sufficiently, since the contents of the liquid crystal cell will be replaced with the inert gas. This further facilitates the manufacture of the liquid crystal display element. The heat and evacuation of the liquid crystal cell may be done simultaneously. However, the vacuum pump needs to operate for a shorter period of time if the heat step precedes the evacuation.

Examples of the inert gas substituted for the contents of the liquid crystal cell include gases of nitrogen, helium, argon, and neon. Especially preferred among them is nitrogen gas. There are, however, no particular requirements, except that the gas does not react with the liquid crystal. The inert gas is preferably highly pure.

There are no particular limitations on the UV-curing sealant. A UV-curing resin composition (sealing resin) conventionally used for liquid crystal display elements can be used. Light in a 330 nm or shorter wavelength region only needs to be removed from the ultraviolet light projected to which the sealant is exposed. It is preferable if light in a 350 nm or shorter wavelength region is removed. The intensity and duration of exposure to the ultraviolet light, as well as the light source, only needs be determined depending on the kind of sealant and other factors. There are no particular requirements to be considered.

There are, however, no particular limitations on how to remove 330 nm or shorter wavelength ultraviolet light; however, it can be readily removed by a filter absorbing light in that wavelength region. The filter only needs to be made of a substance which absorbs light in the 330 nm or shorter wavelength region and allows passage to light in the wavelength region higher than 330 nm. There are no further requirements. Specific, suitable examples of the substance include polyether sulfone which has a very low transmittance to light in a 350 nm or shorter wavelength region. A sheet made of heat resistant, polymeric polyether sulfone is cheap even when the sheet is of a very large size. Also, the sheet does not break or is not damaged due to impact, for example, and therefore is easy to handle. This property is very convenient for applications in industrial manufacturing fields. The use of a polyether sulfone sheet therefore further facilitates the manufacture of the liquid crystal display element with an improved level of display quality.

The ultraviolet light projected to the sealant is preferably in such a wavelength region where the concentration extinction coefficient of the liquid crystal is stable near 0.

Figure 7:
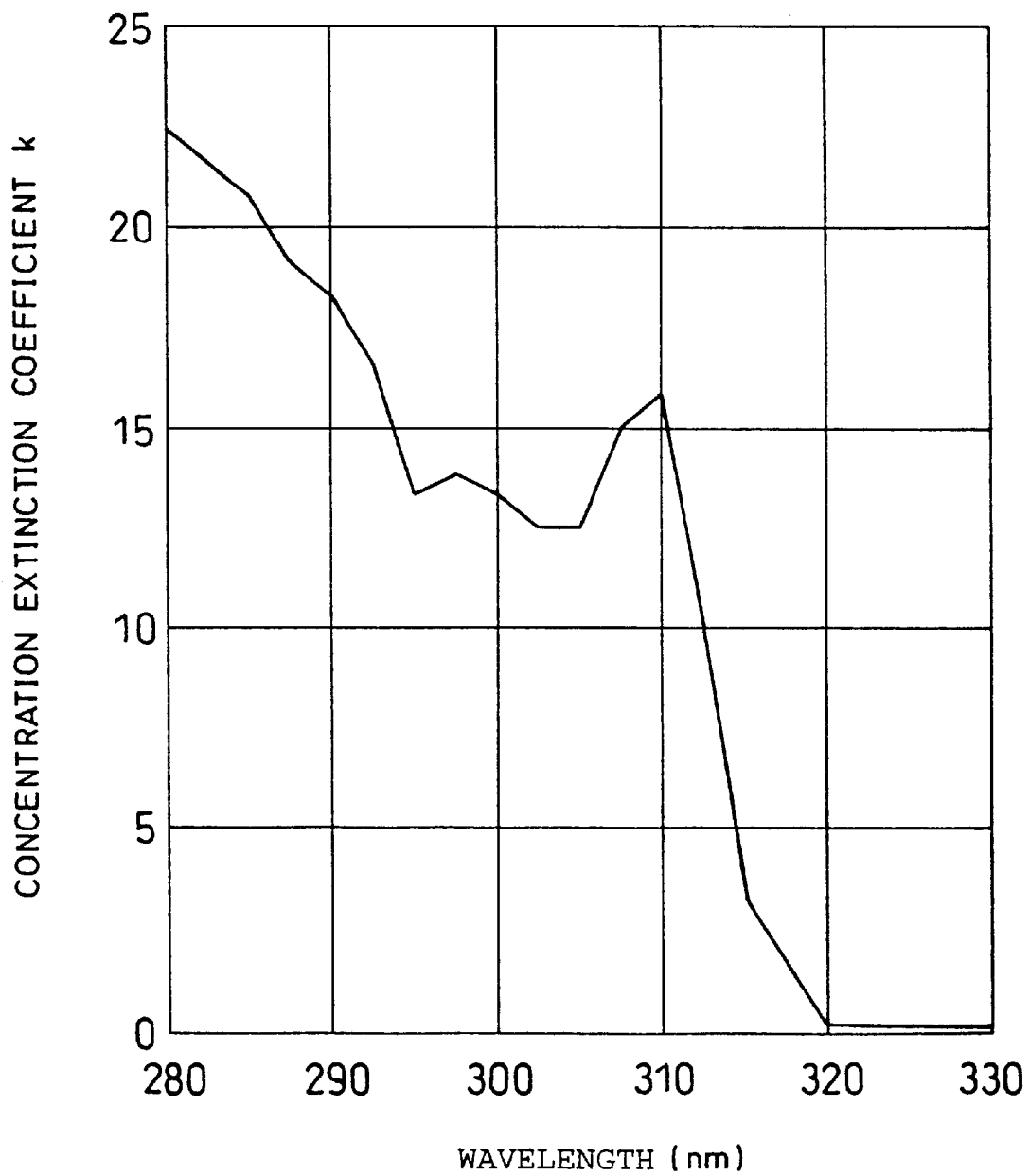
FIG. 7 is a graph showing a relationship between wavelengths of ultraviolet light and the concentration extinction coefficients k of a typical liquid crystal.

The concentration extinction coefficient k of a liquid crystal is given by the equation:

$$k=[\log(1/T)]/C$$

where T is the light transmittance in percentage points (%) and C is the concentration in grams per liter (g/L). FIG. 7 shows that when the incident light wavelength exceeds about 330 nm (ultraviolet region of the spectrum), the concentration extinction coefficient k of a typical liquid crystal equals 0. Typical liquid crystal molecules has a light absorption threshold wavelength at about 330 nm; they absorb ultraviolet light in a 330 nm or shorter wavelength region and, in particular, absorb ultraviolet light in a 320 nm or shorter wavelength region extremely well. The ultraviolet light, as it is absorbed by the liquid crystal molecules, optically excites those molecules and prompts decomposition and degradation of the liquid crystal. Therefore, the ultraviolet light in such a wavelength region where the concentration extinction coefficient k of the liquid crystal is stable near 0 is hardly absorbed by the liquid crystal molecules, and does not decompose or degrade the liquid crystal if projected onto the liquid crystal.

From the foregoing discussion, the ultraviolet light projected onto the sealant is in such a wavelength region where the concentration extinction coefficient k of the liquid crystal is stable near 0, if it is in a wavelengths range above 320 nm. The ultraviolet light in such a wavelength region where the concentration extinction coefficient k of the liquid crystal is stable near 0 is obtainable, for example, by removing the light in the 330 nm or shorter wavelength region from ultraviolet light. Specifically, the aforementioned filter is capable of removing ultraviolet light in the 330 nm or shorter wavelength region, hence in the 320 nm or shorter wavelength region too. Therefore, the ultraviolet light in such a wavelength region where the concentration extinction coefficient k of the liquid crystal is stable near 0 is readily obtainable through the use of such a filter.

The following description will discuss, as an example, manufacturing processes of a liquid crystal display element in accordance with the present invention. The example is by no means intended to make any limitations on the manufacturing processes of a liquid crystal display element.

A liquid crystal cell is fabricated first by a typical fabrication method. Specifically, as shown in the flow chart of FIG. 1, transparent electrodes are formed on the inner sides of a pair of transparent substrates. Then the transparent substrates are subjected to an alignment and other treatments. Sealing material is applied around display areas of the transparent substrates. (These procedures are collectively called a "liquid crystal cell fabrication" step.) Using the sealing material, the substrates are subsequently combined to form a liquid crystal cell, with an injection opening being left open to allow the charging (injection) of liquid crystal through it. (This procedure is called a "combining" step.) In the following step of "cutting," liquid crystal cells, which are formed as a single piece, are now cut into many individual cells or a cell cluster in which cells are lined up end to end. There are, however, no particular limitations on the fabrication method of the liquid crystal cell.

In the "preliminary oven heating" step, the chamber in an oven is heated in advance to 130° C. so that the liquid crystal cell will be heated in it later. Subsequently, the liquid crystal cell after the cutting step (hereinafter, simply, the liquid crystal cell) is fed to the chamber in the "oven loading" step, and heated at 130° C. for two hours in the "heating" step. As a result of the heating, foreign objects that are attracted to the alignment film, etc. on the transparent substrate surface in the fabrication of the liquid crystal cell are now ready to gasify. Examples of the foreign objects include oxygen, water content, acid compounds such as nitrogen oxides and sulfur oxides, and gaseous and other molecules in solvents used in the manufacturing processes of the liquid crystal cell. The oven is suitably of a hot air cycling type which is capable of heating the liquid crystal cell efficiently. There are, however, no particular requirements.

In the "preliminary vacuum oven heating" step, the chamber in a vacuum oven is heated in advance to 130° C. under an air atmosphere so that the liquid crystal cell will be evacuated later. By heating the chamber in the vacuum oven in advance to the same temperature as the liquid crystal cell, the drop in the temperature of the liquid crystal cell is reduced to the smallest extent when the liquid crystal cell is moved from the oven to the vacuum oven. The vacuum oven has, for example, heating plates enclosing the chamber to heat the chamber by radiation. The vacuum oven is equipped with a thermometer and connected to a rotary pump (rotary oil pump) with a capability to evacuate to about 100 Pa and a conduit to feed nitrogen gas (an inert gas) to the chamber. The chamber in the vacuum oven should be heated in advance as mentioned above, because otherwise the liquid crystal cell would cool down rapidly when moved to the vacuum oven and develop an irregular temperature distribution.

In the subsequent step of "vacuum oven loading," the liquid crystal cell heated at 130° C. is moved from the oven to the vacuum oven. Then, the power source for the heater in the vacuum oven is switched off in the "heater switch off" step, and the rotary pump is switched on to evacuate the chamber in the vacuum oven to about 100 Pa in the "evacuation starting" step. This degree of vacuum is maintained throughout the next step of "slow cooling and evacuation," in which the liquid crystal cell is slowly cooled by some measure (or simply left to cool down by itself) to, for example, 40° C. Subsequently to the slow cooling, the contents of the liquid crystal cell is replaced with nitrogen gas in the "nitrogen gas substitute" step, by feeding nitrogen gas (allowing nitrogen gas to leak) to the chamber in the vacuum oven through the conduit and restoring the internal pressure to normal (9.8 kPa). The liquid crystal cell is then removed from the vacuum oven. In the slow cooling step, the liquid crystal cell only needs to be cooled to a temperature substantially equal to room temperature so that the nitrogen gas charged to the liquid crystal cell varies (shrinks) in volume further only by sufficiently small amounts or to such a temperature that the operator does not suffer burns touching unwittingly at the liquid crystal cell. Therefore, the liquid crystal cell may be cooled down a temperature other than 40° C.

FIG. 2 is a graphical representation (timing chart) of, as an example, changes in the temperature and pressure in the chamber of the vacuum oven during the "evacuation starting" and "nitrogen gas substituting" steps, where the temperature and pressure are plotted on the x-axis against the time on the y-axis. In the present invention, the inert gas in the liquid crystal cell is prevented from shrinking, and there is no risk of the air being charged to the liquid crystal cell, because the liquid crystal cell is slowly cooled while being evacuated, followed by the substitution of the inert gas for the contents of the liquid crystal cell. This better keeps the voltage retaining ratio of the liquid crystal at a constant value and further improves the display quality of the resultant liquid crystal display element.

If the liquid crystal cell is removed from the vacuum oven and slowly cooled only after feeding the inert gas to the chamber in the vacuum oven to replace the contents of the liquid crystal cell, the nitrogen gas charged to the liquid crystal cell shrinks, which creates a possibility of the air flowing into the liquid crystal cell through the injection opening. If the liquid crystal cell is slowly cooled first, the air is fed to the chamber in the vacuum oven and the liquid crystal cell is removed, and finally the contents of the liquid crystal cell is replaced with nitrogen gas, water content and other foreign objects in the air fed into the chamber stick so firmly to the alignment film in the liquid crystal cell that they cannot be removed. In both cases, the substitution of nitrogen gas for the contents of the liquid crystal cell possibly fail to deliver expected effects.

In the following step of "injection," liquid crystal is charged through the injection opening using a vacuum impregnation or other popularly known technique. Then, the injection opening is sealed with a sealant, and either the ultraviolet light in such a wavelength region where the concentration extinction coefficient k of the liquid crystal is stable near 0 or the ultraviolet light from which the light in a 330 nm or shorter wavelength region is removed is projected to the sealant to cure it in the "sealing" step. A liquid crystal display element in accordance with the present invention is thus obtained.

The following will discuss the above "sealing" step in further detail by means of an example. Here, ultraviolet light from which the light in a 330 nm or shorter wavelength region is removed is used in the exposure. As shown in FIG. 3, in the "sealing" step in accordance with the present invention, a sheet-like filter 4 is interposed between the light source 5 and the liquid crystal cell 1 of which the injection opening is sealed by the sealant 2. The filter 4 filters out light (electromagnetic waves) in the 330 nm or shorter wavelength region from the ultraviolet light 3 emitted by the light source 5. This way, the sealant 2 is exposed only to ultraviolet light 6 from which the 330 nm or shorter wavelength light is removed.

In the arrangement, being exposed to the ultraviolet light 3 emitted by the light source 5, the filter 4 absorbs the 330 nm or shorter wavelength light and passes the remaining, longer-than-330 nm wavelength light (i.e., ultraviolet light 6). The ultraviolet light 6 irradiates and causes the sealant 2 to cure, but does not optically excite the liquid crystal molecules. The ultraviolet light 6 hence does not prompt the decomposition or degradation of the liquid crystal.

As described in detail above, according to the manufacturing method of a liquid crystal display element of the present invention, the liquid crystal cell is evacuated before the contents of the liquid crystal cell is replaced with an inert gas and liquid crystal is charged in the liquid crystal cell; therefore, water content and other foreign objects is removed from the liquid crystal cell, and there is no risk of the air being charged into the liquid crystal cell. There is therefore no risk of the liquid crystal being charged into the liquid crystal cell degrading due to adverse effects of the foreign objects, and the voltage retaining ratio of the liquid crystal is kept unchanged. Accordingly, liquid crystal display elements are manufactured with improved display quality.

As described in detail above, according to the manufacturing method of a liquid crystal display element of the present invention, the liquid crystal cell filled with liquid crystal is sealed with a UV-curing sealant before the sealant is cured by its exposure to the ultraviolet light in such a wavelength region where the concentration extinction coefficient k of the liquid crystal is stable near 0 or ultraviolet light from which the shorter-than-330 nm wavelength light is removed. Therefore, the ultraviolet light projected onto the sealant does not include the light in the 330 nm or shorter wavelength region which optically excites the liquid crystal molecules and prompt the decomposition or degradation of the liquid crystal. Therefore, there is no risk of the liquid crystal being adversely affected by the ultraviolet light to which the sealant is exposed for curing, and the voltage retaining ratio of the liquid crystal is kept unchanged. Accordingly, liquid crystal display elements are manufactured with improved display quality. Further, since the voltage retaining ratio of the liquid crystal is kept unchanged, no so-called UV burns (display defect in which the display area shows a condition as if it were burnt) occurs in the display area of the liquid crystal display element. The invention liquid crystal display element in accordance with the present can be therefore suitably used as a component in various liquid crystal display devices (LCDs).

The manufacturing method of a liquid crystal display element in accordance with the present invention, as described in detail above, may be such that the interior of the liquid crystal cell is heated, and evacuated by means of depressurization.

In the arrangement, the interior of the liquid crystal cell is heated and depressurized, which facilitates the evacuation of the liquid crystal cell. Foreign objects are better removed from the interior of the liquid crystal cell. Accordingly, liquid crystal display elements are manufactured with improved display quality.

The manufacturing method of a liquid crystal display element in accordance with the present invention, as described in detail above, may be such that the liquid crystal cell is slowly cooled while evacuating by means of depressurization, before the contents of the liquid crystal cell is replaced with an inert gas.

According to the arrangement, the inert gas in the liquid crystal cell is prevented from shrinking; therefore, there is no risk of the air being charged into the liquid crystal cell. The voltage retaining ratio of the liquid crystal is hence better kept unchanged. Accordingly, liquid crystal display elements are manufactured with improved display quality.

The method of a liquid crystal display element in accordance with the present invention manufacturing is preferably such that the liquid crystal cell is made of a pair of plastic substrates.

In the arrangement, the liquid crystal cell is made of a pair of plastic substrates; therefore, there is no risk of the liquid crystal cell being damaged in the heating and evacuation, and the plastic substrates are easier to handle. This further facilitates the manufacture of the liquid crystal display element.

The method of a liquid crystal display element in accordance with the present invention manufacturing, as described in detail above, is characterized in that the liquid crystal cell into which liquid crystal is charged is sealed with a UV-curing sealant, before the sealant is caused to cure by the irritation with the ultraviolet light in such a wavelength region where the concentration extinction coefficient k of the liquid crystal is stable near 0.

In the arrangement, the ultraviolet light projected to the sealant is in such a wavelength region where the concentration extinction coefficient k of the liquid crystal is stable near 0, and therefore hardly absorbed by the liquid crystal when it is projected to the liquid crystal. Therefore, the ultraviolet light rarely optically excites the liquid crystal molecules and decomposes or degrades the liquid crystal. There is no risk of the liquid crystal being adversely affected by the ultraviolet light projected to cure the sealant. The voltage retaining ratio of the liquid crystal is kept unchanged. Accordingly, liquid crystal display elements are manufactured with improved display quality. Further, since the voltage retaining ratio of the liquid crystal is kept unchanged, no so-called UV burns (display defect in which the display area shows a condition as if it were burnt) occurs in the display area of the liquid crystal display element.

The method of a liquid crystal display element in accordance with the present invention manufacturing, as described in detail above, is characterized in that the liquid crystal cell into which liquid crystal is charged is sealed with a UV-curing sealant, before the sealant is cured by the exposure to ultraviolet light from which the 330 nm or shorter wavelength regions have been removed.

In the arrangement, the ultraviolet light projected to the sealant contains no such light in the 330 nm or shorter wavelength region that optically excites the liquid crystal molecules and prompts the decomposition or degradation of the liquid crystal. There is therefore no risk of the liquid crystal being adversely affected by the ultraviolet light projected to cure the sealant. The voltage retaining ratio of the liquid crystal is kept unchanged. Accordingly, liquid crystal display elements are manufactured with improved display quality. Further, since the voltage retaining ratio of the liquid crystal kept unchanged, no so-called UV burns (display defect in which the display area shows a condition as if it were burnt) occurs in the display area of the liquid crystal display element.

The manufacturing method of a liquid crystal display element in accordance with the present invention may be, in addition to a foregoing arrangement, such that a filter made of polyether sulfone is provided to remove the shorter-than-330 nm wavelength light from ultraviolet light.

A sheet heat resistant, polymeric polyether sulfone is cheap even when the sheet is of a very large size. Also, the sheet does not break or is not damaged due to impact, for example, and therefore is easy to handle. This property is very convenient for applications in industrial manufacturing fields. The arrangement further facilitates the manufacture of liquid crystal display elements with an improved level of display quality.

[Embodiment 2]

Figure 8:
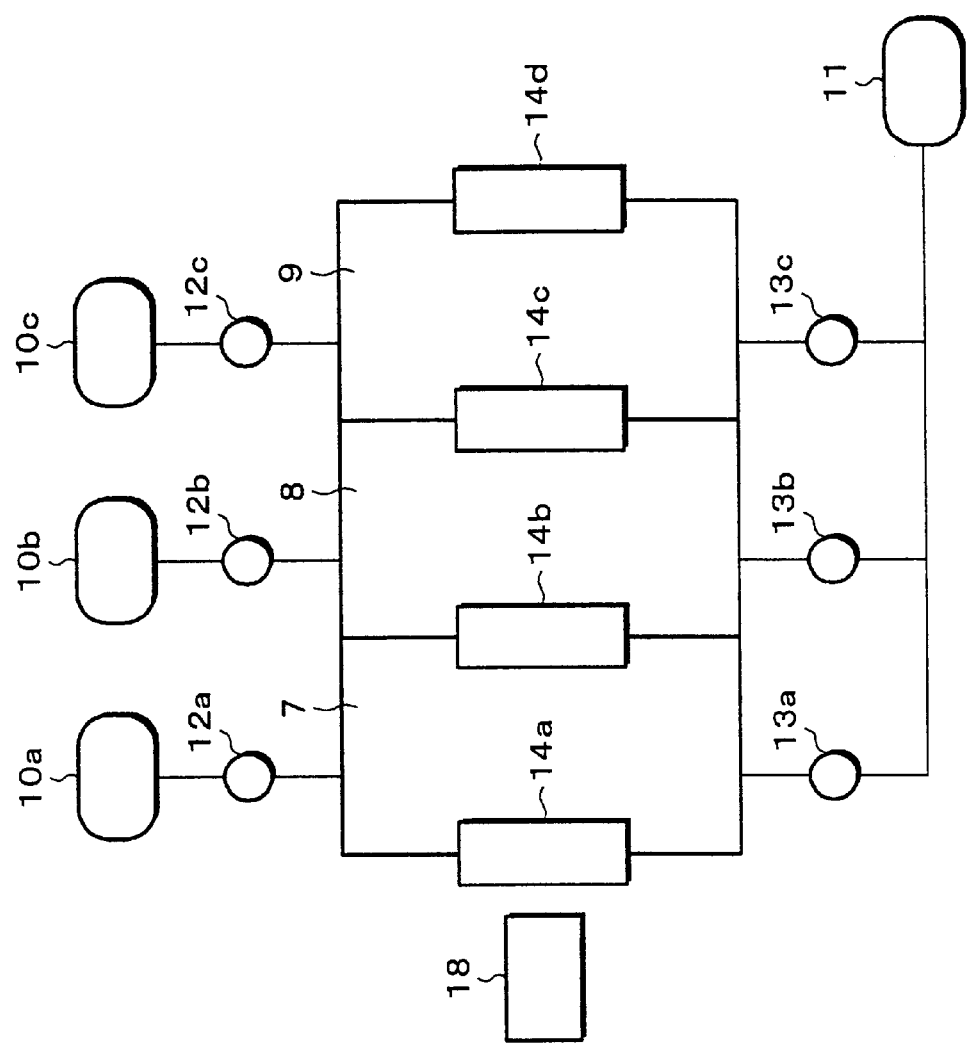
FIG. 8 is a block diagram schematically showing a manufacturing device of a liquid crystal display element in accordance with an embodiment of the present invention.

The following description will discuss a manufacturing device of a liquid crystal display element in accordance with an embodiment of the present invention in reference to FIG. 8, The manufacturing device of a liquid crystal display element in accordance with the present embodiment, as shown in FIG. 8, includes an evacuation chamber (depressurization device) 7, an inert gas substitution chamber (inert gas substitution device) 8, and a liquid crystal charging chamber (liquid crystal charging device) 9 interconnected in this order.

The evacuation chamber 7 is adapted so that contents can flow from it to the inert gas substitution chamber 8 and vice versa. The evacuation chamber 7 has doors 14a and 14b that can be freely opened and closed. The door 14a is adapted so that a liquid crystal cell holder cassette 18 can be loaded through it, and to seal the evacuation chamber 7 when closed. The door 14b is disposed between the evacuation chamber 7 and the inert gas substitution chamber 8, separating and sealing the evacuation chamber 7 from the inert gas substitution chamber 8. The evacuation chamber 7 is connected to a vacuum pump 10a via a conduit equipped with a vacuum valve 12a. It is preferable if the vacuum pump 10a, as well as the vacuum pumps 10b and 10c mentioned later in the present embodiment and the vacuum pumps 10d and 10e used in a later embodiment, is a combination of a rotary pump with an evacuation capability of 100 L/min to 200 L/min and a mechanical booster and can create a vacuum of 100 Pa or lower. There are, however, no particular limitations on the vacuum pumps. In this configuration, the evacuation chamber 7 can be depressurized as required, by opening the vacuum valve 12a and running the vacuum pump 10a with the doors 14a and 14b being left closed. The evacuation chamber 7 is connected to an inert gas supply system 11 via a conduit equipped with an inert gas valve 13a. An inert gas can be supplied to the evacuation chamber 7 as required, by the opening or closing of the inert gas valve 13a. The evacuation chamber 7, the vacuum pump 10a, the inert gas supply system 11, the vacuum valve 12a, the inert gas valve 13a, etc. constitute a depressurization device which depressurizes the liquid crystal cell.

The inert gas substitution chamber 8 is adapted so that contents can flow from it to the liquid crystal charging chamber 9 and vice versa. A door 14c is disposed between the inert gas substitution chamber 8 and the liquid crystal charging chamber 9 so as to be freely opened and closed. The door 14c separates and seals the inert gas substitution chamber 8 from the liquid crystal charging chamber 9. The inert gas substitution chamber 8 is connected to the vacuum pump 10b via a conduit equipped with a vacuum valve 12b. The inert gas substitution chamber 8 can be depressurized as required, by opening vacuum valve 12b and running the vacuum pump 10b with the doors 14b and 14c being left closed. Further, the inert gas substitution chamber 8 is connected to an inert gas supply system 11 via a conduit equipped with an inert gas valve 13b. An inert gas can be supplied to the inert gas substitution chamber 8 by the opening and closing of the inert gas valve 13b. The inert gas substitution chamber 8, the vacuum pump 10b, the inert gas supply system 11, the vacuum valve 12b, the inert gas valve 13b, etc. constitute an inert gas substitution device which substitutes an inert gas for the contents of the liquid crystal cell.

The liquid crystal charging chamber 9 has a door 14d that can be freely opened and closed. The door 14d is adapted to seal the liquid crystal charging chamber 9 when closed. The liquid crystal cell holder cassette 18 can be moved out through the door 14d. The liquid crystal charging chamber 9 is connected to the vacuum pump 10c via a conduit equipped with a vacuum valve 12c. The liquid crystal charging chamber 9 can be evacuated by opening the vacuum valve 12c and running the vacuum pump 10c with the doors 14c and 14d being left closed. The liquid crystal charging chamber 9 is connected to an inert gas supply system 11 via a conduit equipped with an inert gas valve 13c. An inert gas can be supplied to the liquid crystal charging chamber 9 by the opening and closing of the inert gas valve 13c. The liquid crystal charging chamber 9, the vacuum pump 10c, the inert gas supply system 11, the vacuum valve 12c, the inert gas valve 13c, etc. constitute a liquid crystal charging device which charges liquid crystal to a liquid crystal cell.

Now, an operation will be explained whereby liquid crystal is charged to a liquid crystal cell using this manufacturing device of a liquid crystal display element.

The vacuum valves 12a to 12c, the inert gas valves 13a to 13c, and the doors 14a to 14d are all closed before the operation is started. A liquid crystal cell with no liquid crystal is loaded into the liquid crystal cell holder cassette 18 and heated using a device. The door 14a is opened, and the liquid crystal cell holder cassette 18 is moved into the evacuation chamber 7 through it. Before moving the liquid crystal cell holder cassette 18 into the evacuation chamber 7, the inert gas valve 13a is opened to allow the supply of an inert gas from the inert gas supply system 11 and thereby adjust the internal pressure of the evacuation chamber 7 roughly to atmospheric pressure. The evacuation chamber 7 is evacuated to 100 Pa by first closing the door 14a, subsequently closing the inert gas valve 13a, opening the vacuum valve 12a, and running the vacuum pump 10a. The inert gas substitution chamber 8 is evacuated to the same pressure as the evacuation chamber 7, i.e., 100 Pa, by opening the vacuum valve 12b and running the vacuum pump 10b, prior to the opening of the door 14b and subsequent moving of the liquid crystal cell holder cassette 18 from the evacuation chamber 7 to the inert gas substitution chamber 8. After moving the liquid crystal cell holder cassette 18 to the inert gas substitution chamber 8, the door 14b is closed. The inert gas valve 13b is opened to allow an inert gas to flow from the inert gas supply system 11 to the inert gas substitution chamber 8. Then the inert gas valve 13b is closed. There are no particular limitations on the internal pressure of the inert gas substitution chamber 8 as long as it is equal to or greater than atmospheric pressure. If the internal pressure of the inert gas substitution chamber 8 is set to 2 atm or greater, the manufacturing device of a liquid crystal display element needs to be capable of both pressurization and depressurization and is inevitably expensive. Therefore, the upper limit of the internal pressure of the inert gas substitution chamber 8 is set preferably in a range that the device is capable of handling, and most preferably to about 1.5 atm. Further, the manufacturing device of a liquid crystal display element may have a pressure releasing valve in the inert gas substitution chamber 8 so that the internal pressure grows out of the range that can be handled by the device. This way, the contents of the liquid crystal cell loaded in the liquid crystal cell holder cassette 18 is replaced with an inert gas.

Next, the internal pressure of the liquid crystal charging chamber 9 is adjusted to about the same value as that of the inert gas substitution chamber 8 by opening the inert gas valve 13c and thus charging an inert gas. The adjustment should be effected before the liquid crystal cell holder cassette 18 is moved into the liquid crystal charging chamber 9. The door 14c is opened to move the liquid crystal cell holder cassette 18 from the inert gas substitution chamber 8 to the liquid crystal charging chamber 9. After the moving, the door 14c is closed.

Then, the liquid crystal charging chamber 9 is evacuated to 100 Pa by closing the inert gas valve 13c and subsequently opening the vacuum valve 12c and running the vacuum pump 10c. Liquid crystal is then charged to the liquid crystal cell by vacuum impregnation. The inert gas supplied from the inert gas supply system 11 serves the purposes of the leak gas used in vacuum impregnation and is introduced as such by opening the inert gas valve 13c. After liquid crystal is charged, the door 14d is opened, and the liquid crystal cell holder cassette 18 is moved out to carry out the "sealing" step.

As described in detail above, with the manufacturing device of a liquid crystal display element, foreign objects (for example, oxygen, water content, acid compounds such as nitrogen oxides and sulfur oxides, and gaseous and other molecules in solvents used in the manufacturing processes of the liquid crystal display element) are removed from the liquid crystal cell, and there is no risk of the air being charged into the liquid crystal cell. There is therefore no risk of the liquid crystal being charged into the liquid crystal cell degrading due to adverse effects of the foreign objects, and the voltage retaining ratio of the liquid crystal is kept unchanged. Accordingly, liquid crystal display elements are manufactured with improved display quality. Further, no special vacuum pump (to effect an extremely high degree of vacuum) is required to evacuate the liquid crystal cell, and a general purpose vacuum pump serves the purpose sufficiently, since the contents of the liquid crystal cell will be replaced with the inert gas. This makes it possible to offer a manufacturing device which further facilitates the manufacture of the liquid crystal display element. Further, the chambers are interconnected, and thereby can handle the series of steps from the evacuation of the liquid crystal cell to the charging of liquid crystal to the liquid crystal cell.

[Embodiment 3]

Figure 9:
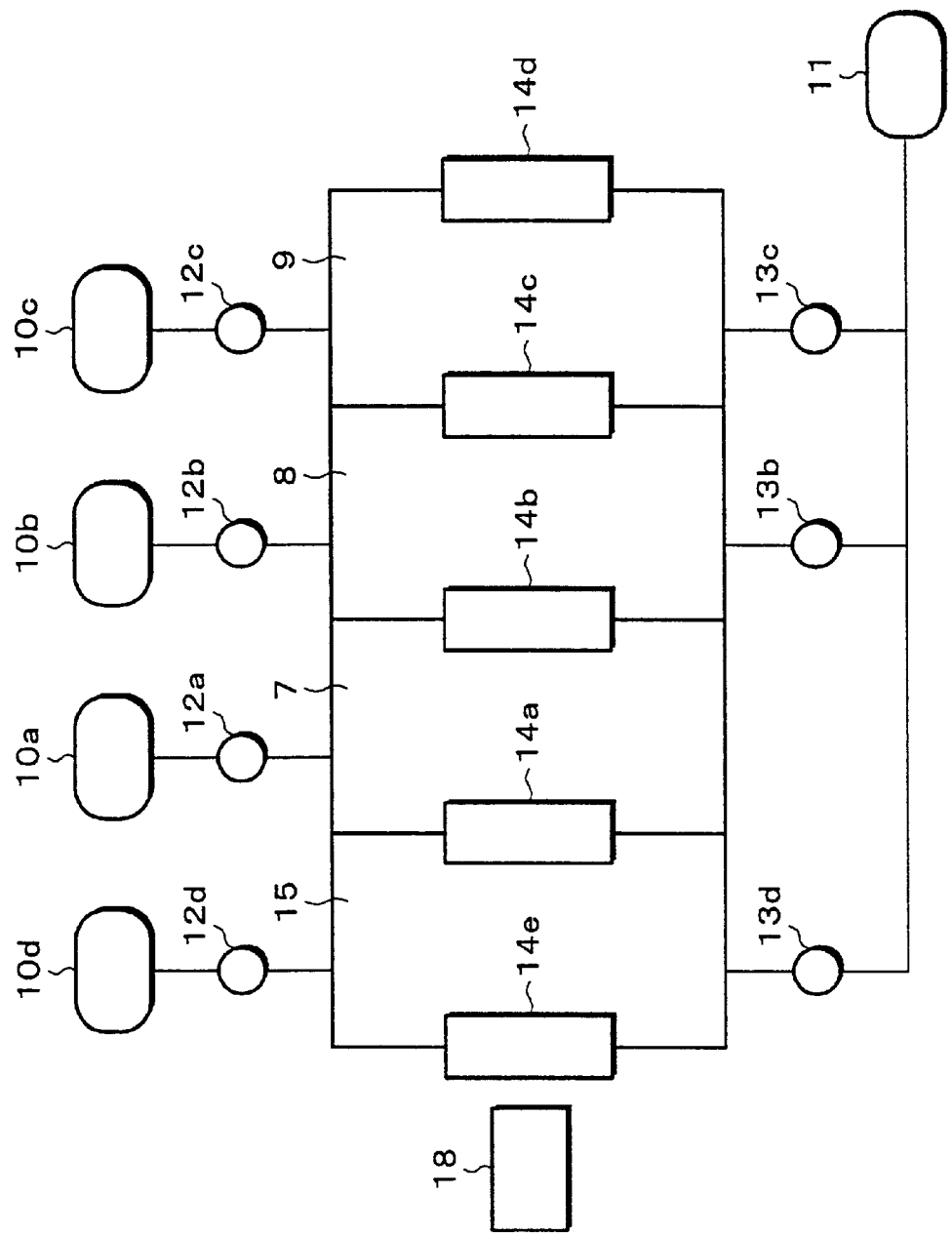
FIG. 9 is a block diagram schematically showing a manufacturing device of a liquid crystal display element in accordance with another embodiment of the present invention.

The following description will discuss a manufacturing device of a liquid crystal display element in accordance with another embodiment of the present invention in reference to FIG. 9. Here, for convenience, members (arrangement) of the present embodiment that have the same function as members (arrangement) shown in drawings for embodiment 2 are indicated by the same reference numerals and description thereof is omitted.

A manufacturing device of a liquid crystal display element in the present embodiment, as shown in FIG. 9, has the same configuration as the manufacturing device of a liquid crystal display element (FIG. 8) in accordance with embodiment 2 above, except that a preliminary evacuation chamber (preliminary evacuation device) 15 is provided before the evacuation chamber (evacuation device) 7. In other words, the manufacturing device of a liquid crystal display element includes a preliminary evacuation chamber 15, a evacuation chamber 7, an inert gas substitution chamber 8, and a liquid crystal charging chamber 9 connected in this order.

The preliminary evacuation chamber 15 is adapted so that contents can flow from it to the evacuation chamber 7 and vice versa. The preliminary evacuation chamber 15 doors 14a and 14e that can be freely opened and closed. The door 14a is disposed between the preliminary evacuation chamber 15 and the evacuation chamber 7, separating and sealing the preliminary evacuation chamber 15 from the evacuation chamber 7. The door 14e is adapted so that a liquid crystal cell holder cassette 18 can be loaded into the preliminary evacuation chamber 15 through it. The preliminary evacuation chamber 15 is connected to the vacuum pump 10d via a conduit equipped with a vacuum valve 12d. The preliminary evacuation chamber 15 is connected to the inert gas supply system 11 via a conduit equipped with the inert gas valve 13d. The evacuation chamber 7 is not connected to the inert gas supply system 11, because the preliminary evacuation chamber 15 is evacuated and the evacuation chamber 7 only needs to be depressurized. No inert gas needs to be supplied to the evacuation chamber 7. The evacuation chamber 7, the vacuum pump 10a, the vacuum valve 12a, etc. constitute a vacuum device for depressurize the liquid crystal cell. The preliminary evacuation chamber 15, the vacuum pump 10d, the inert gas supply system 11, the vacuum valve 12d, the inert gas valve 13d, etc. constitute a preliminary evacuation device for depressurizing the liquid crystal cell in advance prior to the moving of the liquid crystal cell holder cassette 18 into the evacuation chamber 7. The vacuum device and the preliminary evacuation device constitute a depressurization device, which ensures the depressurization of the liquid crystal cell. The manufacturing device of a liquid crystal display element is otherwise configured in the same manner as that of embodiment 2.

Now, an operation will be explained whereby liquid crystal is charged to a liquid crystal cell using this manufacturing device of a liquid crystal display element.

The vacuum valves 12a to 12d, the inert gas valves 13b to 13c, and the doors 14a to 14e are all closed before the operation is started. A liquid crystal cell with no liquid crystal is loaded into the liquid crystal cell holder cassette 18 and heated using a device. The door 14e is opened, and the liquid crystal cell holder cassette 18 is moved into the preliminary evacuation chamber 15 through it. Before moving the liquid crystal cell holder cassette 18 into the preliminary evacuation chamber 15, the inert gas valve 13d is opened to allow the supply of an inert gas from the inert gas supply system 11 and thereby adjust the internal pressure of the preliminary evacuation chamber 15 roughly to atmospheric pressure. The preliminary evacuation chamber 15 is evacuated to 100 Pa by first closing the door 14e, subsequently closing the inert gas valve 13d, opening the vacuum valve 12d, and running the vacuum pump 10d. The evacuation chamber 7 is evacuated to 100 Pa by opening the vacuum valve 12a and running the vacuum pump 10a, prior to the moving of the liquid crystal cell holder cassette 18 to the evacuation chamber 7. The door 14a is then opened to move the liquid crystal cell holder cassette 18 from the preliminary evacuation chamber 15 to the evacuation chamber 7. The rest of the operation is conducted in the same manner as in embodiment 2.

As described in detail above, with the manufacturing device of a liquid crystal display element, the preliminary evacuation chamber 15 is used for depressurization, which enables the evacuation chamber 7 to be always in a depressurized condition. The evacuation chamber 7, since being kept in a depressurization condition, does not allow water content, oxygen, and gaseous and other molecules in solvents to enter and enables the liquid crystal cell prior to liquid crystal charging to be stored in the evacuation chamber 7. Further, it is now possible to let the liquid crystal cell holder cassette 18 which is hot due to heating and the liquid crystal cell held by the liquid crystal cell holder cassette 18 to slowly cool down in the evacuation chamber 7. Liquid crystal is charged into the liquid crystal cell only thereafter, and there is no risk of the liquid crystal charged into the liquid crystal cell to degrade due to adverse effects of impurities and temperature. A liquid crystal display element can be thus manufactured which does not degrade over time and which still produces a uniform display even after it is in use for a long period of time.

[Embodiment 4]

Figure 10:
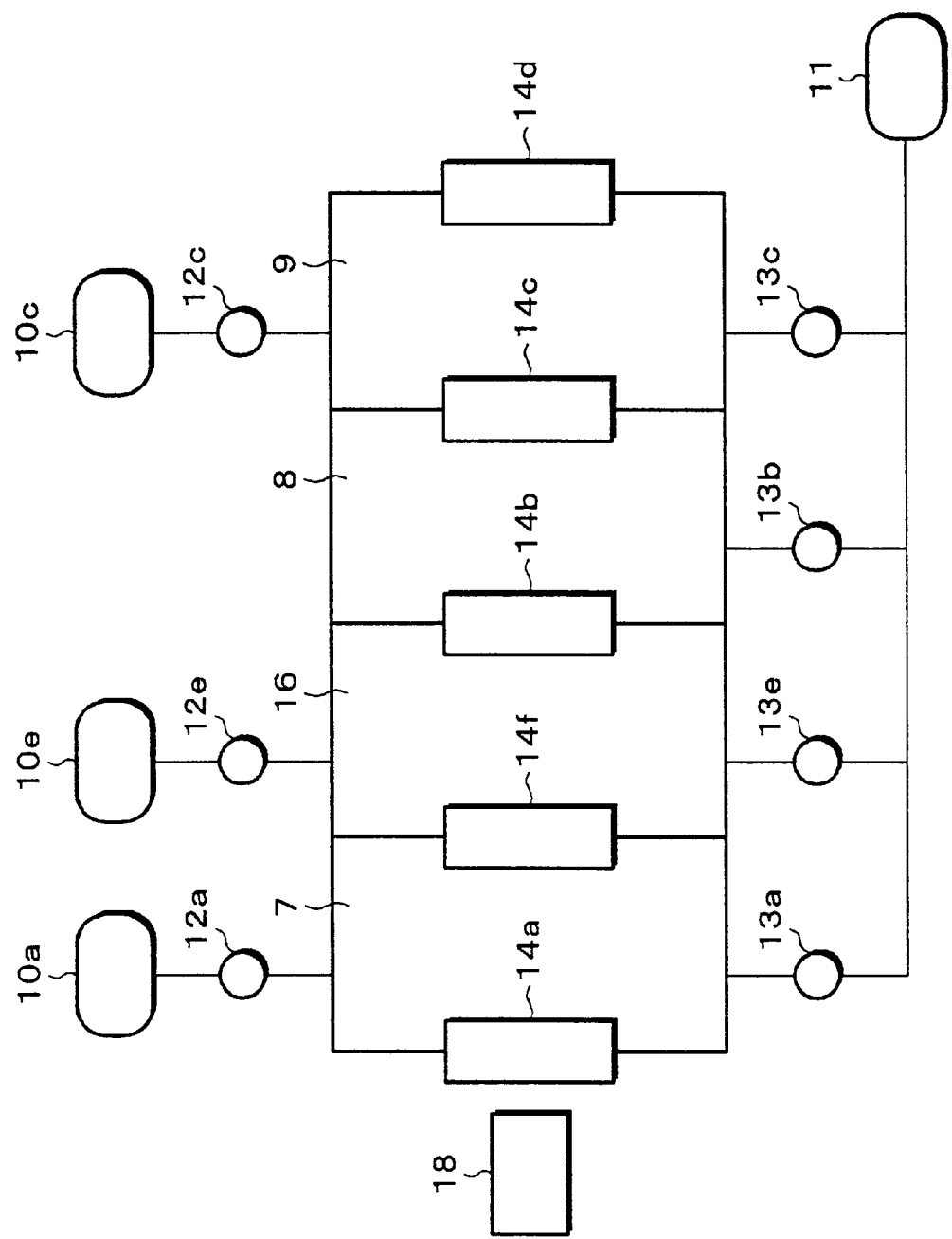
FIG. 10 is a block diagram schematically showing a manufacturing device of a liquid crystal display element in accordance with a further embodiment of the present invention.

The following description will discuss a manufacturing device of a liquid crystal display element in accordance with a further embodiment of the present invention in reference to FIG. 10. Here, for convenience, members (arrangement) of the present embodiment that have the same function as members (arrangement) shown in drawings for embodiment 2 are indicated by the same reference numerals and description thereof is omitted.

A manufacturing device of a liquid crystal display element in accordance with the present embodiment, as shown in FIG. 10, has the same configuration as the manufacturing device of a liquid crystal display element (FIG. 8) in accordance with embodiment 2 above, except that a pressure adjusting chamber (pressure adjusting device) 16 is interposed between the evacuation chamber 7 and the inert gas substitution chamber 8. In other words, the manufacturing device of a liquid crystal display element includes the evacuation chamber 7, the pressure adjusting chamber 16, the inert gas substitution chamber 8, and the liquid crystal charging chamber 9 connected in this order.

The pressure adjusting chamber 16 is adapted so that contents can flow from it to the evacuation chamber 7 and vice versa and separated from the evacuation chamber 7 by a door 14f that can be freely opened and closed. The pressure adjusting chamber 16 is further adapted so that contents can flow from it to the inert gas substitution chamber 8 and vice versa and is separated from the inter gas substitution chamber 8 by the door 14b that can be freely opened and closed. The doors 14b and 14f are able to seal these chambers. The pressure adjusting chamber 16 is connected to a vacuum pump 10e via a conduit equipped with a vacuum valve 12e and to an inert gas supply system 11 via a conduit equipped with an inert gas valve 13e. The inert gas substitution chamber 8 does not need to be depressurized and is not connected to a vacuum pump, since the pressure in it is adjusted to atmospheric pressure using the pressure adjusting chamber 16. The inert gas substitution chamber 8 may be adapted so that it can accommodate more than one liquid crystal cell holder cassettes 18. The pressure adjusting chamber 16, the vacuum pump 10e, the inert gas supply system 11, the vacuum valve 12e, the inert gas valve 13e, etc. constitute a pressure adjusting device for adjusting the pressure difference between the evacuation chamber 7 and the inert gas substitution chamber 8. The inert gas substitution chamber 8, the inert gas supply system 11, the inert gas valve 13b, etc. constitute a substitution device for substituting an inert gas for the contents of the liquid crystal cell. The pressure adjusting device and the substitution device constitute an inert gas substitution device, which ensures the substitution of an inert gas for the contents of the liquid crystal cell. The manufacturing device of a liquid crystal display element is otherwise configured in the same manner as in embodiment 2.

Now, an operation will be explained whereby liquid crystal is charged to a liquid crystal cell using this manufacturing device of a liquid crystal display element.

The vacuum valves 12a, 12c and 12e, the inert gas valves 13a to 13c and 13e, and the doors 14a to 14d and 14f are all closed before the operation is started. A liquid crystal cell with no liquid crystal is loaded into the liquid crystal cell holder cassette 18 and heated using a device. In the device, the liquid crystal cell holder cassette 18 is moved from the evacuation chamber 7 to the inert gas substitution chamber 8 through the pressure adjusting chamber 16. Now, an operation will be explained whereby the liquid crystal cell holder cassette 18 is moved passing through the pressure adjusting chamber 16 with the evacuation chamber 7 being depressurized. Before moving the liquid crystal cell holder cassette 18 to the pressure adjusting chamber 16, the pressure adjusting chamber 16 is evacuated roughly to the same degree of vacuum as the evacuation chamber 7 by opening the vacuum valve 12e and running the vacuum pump 10e. The vacuum valve 12e is then closed, and the door 14f is opened to move the liquid crystal cell holder cassette 18 from the evacuation chamber 7 to the pressure adjusting chamber 16. The pressure in the pressure adjusting chamber 16 is adjusted roughly to be equal to that in the inert gas substitution chamber 8 by closing the door 14f and opening the inert gas valve 13e to let an inert gas supply to flow in from the inert gas supply system 11. In these circumstances, the pressure in the inert gas substitution chamber 8 is roughly equal to atmospheric pressure, since the inert gas valve 13b is opened to let an inert gas supply to flow in from the inert gas supply system 11. The door 14b is then opened to move the liquid crystal cell holder cassette 18 to the inert gas substitution chamber 8. The rest of the operation is conducted in the same manner as in embodiment 2.

As described in detail above, in the manufacturing device of a liquid crystal display element, the pressure adjusting chamber 16 is provided; therefore, the pressure difference becomes adjustable between the evacuation chamber 7 and the inert gas substitution chamber 8. Thus, an inert gas can be always charged in the inert gas substitution chamber 8 without depressurizing the inert gas substitution chamber 8. Consequently, the liquid crystal cell which contains no water content, oxygen, or gaseous and other molecules in solvents and whose contents are replaced with an inert gas can be stored and slowly cooled down. The liquid crystal is only subsequently charged to the liquid crystal cell. Therefore, there is no risk of the liquid crystal charged to the liquid crystal cell degrading due to adverse effects of impurities and temperature. A liquid crystal display element can be thus manufactured which does not degrade over time and which still produces a uniform display even after it is in use for a long period of time.

[Embodiment 5]

Figure 11:
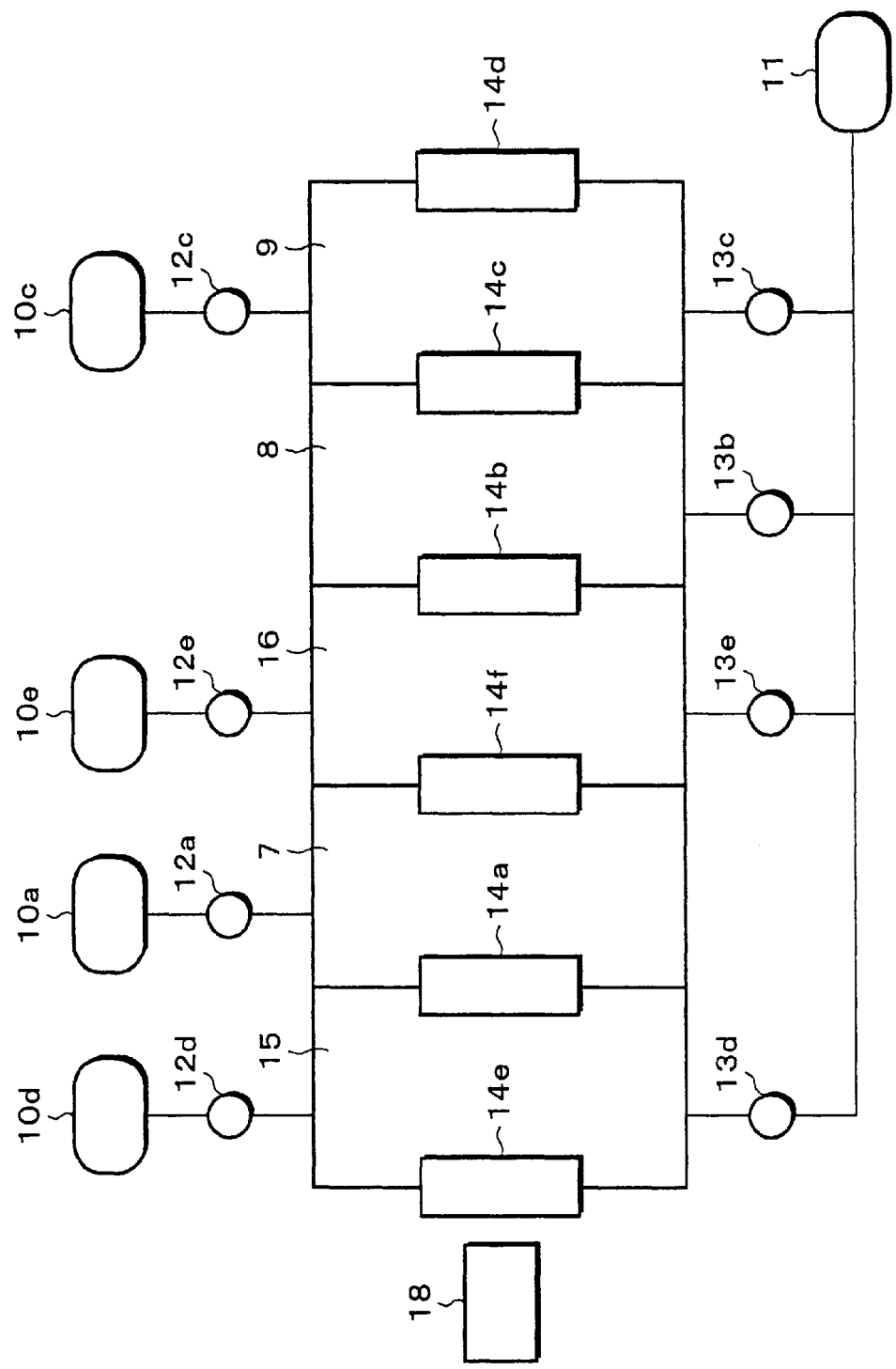
FIG. 11 is a block diagram schematically showing a manufacturing device of a liquid crystal display element in accordance with still another embodiment of the present invention.

The following description will discuss a manufacturing device of a liquid crystal display element in accordance with a further embodiment of the present invention in reference to FIG. 11. Here, for convenience, members (arrangement) of the present embodiment that have the same function as members (arrangement) shown in drawings for embodiments 3 or 4 are indicated by the same reference numerals and description thereof is omitted.

A manufacturing device of a liquid crystal display element in accordance with the present embodiment, as shown in FIG. 11, has the same configuration as the manufacturing device of a liquid crystal display element (FIG. 10) in accordance with embodiment 4 above, except that a preliminary evacuation chamber 15 is provided before the evacuation chamber 7. In other words, the manufacturing device of a liquid crystal display element includes a preliminary evacuation chamber 15, the evacuation chamber 7, the pressure adjusting chamber 16, the inert gas substitution chamber 8, and the liquid crystal charging chamber 9 connected in this order.

The preliminary evacuation chamber 15, the vacuum pump 10d, the inert gas supply system 11, the vacuum valve 12d, the inert gas valve 13d, the doors 14a and 14e here are all adapted in the same manners as their counterparts in the manufacturing device of a liquid crystal display element of embodiment 3. The manufacturing device of a liquid crystal display element is otherwise configured in the same manner as that of embodiment 4.

Now, an operation will be explained whereby liquid crystal is charged to a liquid crystal cell using the manufacturing device of a liquid crystal display element.

The vacuum valves 12a and 12c to 12e, the inert gas valves 13b to 13e, and the doors 14a to 14f are all closed before the operation is started. A liquid crystal cell with no liquid crystal is loaded into the liquid crystal cell holder cassette 18 and heated using a device. The liquid crystal cell holder cassette 18 is moved into the preliminary evacuation chamber 15 and then on to the evacuation chamber 7 in the same manner as in embodiment 3. The rest of the operation is conducted in the same manners as in embodiment 4.

As described in detail above, in the manufacturing device of a liquid crystal display element, the preliminary evacuation chamber 15 and the pressure adjusting chamber 16 are provided; therefore, the liquid crystal cell holder cassette 18, together with the liquid crystal cell mounted to it, can be stored in the evacuation chamber 7 and the inert gas substitution chamber 8 after removing water content, oxygen, and gaseous and other molecules in solvents from the liquid crystal cell and the liquid crystal cell holder cassette 18. This ensures that the liquid crystal cell holder cassette 18 and the liquid crystal cell mounted to it are slowly cooled down to room temperature. The liquid crystal is only subsequently charged to the liquid crystal cell. Therefore, there is no risk of the liquid crystal charged to the liquid crystal cell degrading due to adverse effects of impurities and temperature. A liquid crystal display element can be thus manufactured which does not degrade over time and which still produces a uniform display even after it is in use for a long period of time.

[Embodiment 6]

The following description will discuss a manufacturing device of a liquid crystal display element in accordance with a further embodiment of the present invention in reference to FIG. 12. Here, for convenience, members (arrangement) of the present embodiment that have the same function as members (arrangement) shown in drawings for embodiment 5 are indicated by the same reference numerals and description thereof is omitted.

A manufacturing device of a liquid crystal display element in accordance with the present embodiment, as shown in FIG. 12, has the same configuration as the manufacturing device of a liquid crystal display element (FIG. 11) in accordance with embodiment 5 above, except that a heating furnace (heating device) 17 is provided. In other words, the manufacturing device of a liquid crystal display element includes a heating furnace 17, the preliminary evacuation chamber 15, the evacuation chamber 7, the pressure adjusting chamber 16, the inert gas substitution chamber 8, and the liquid crystal charging chamber 9 connected in this order. The heating furnace 17 is adapted so that contents can flow from it to the preliminary evacuation chamber 15 and vice versa and is separated from the preliminary evacuation chamber 15 by the door 14e that can be freely opened and closed. The manufacturing device of a liquid crystal display element is otherwise configured in the same manner as that of embodiment 5.

Now, an operation will be explained whereby liquid crystal is charged to a liquid crystal cell using the manufacturing device of a liquid crystal display element.

The vacuum valves 12a and 12c to 12e, the inert gas valves 13b to 13e, and the doors 14a to 14f are all closed before the operation is started. A liquid crystal cell with no liquid crystal is loaded into the liquid crystal cell holder cassette 18 and placed in the heating furnace 17 where it is heated. Then, the door 14e is opened, and the liquid crystal cell holder cassette 18 is moved into the preliminary evacuation chamber 15 through it. Before moving the liquid crystal cell holder cassette 18 into the preliminary evacuation chamber 15, the inert gas valve 13d is opened to allow the supply of an inert gas from the inert gas supply system 11 and thereby adjust the internal pressure of the preliminary evacuation chamber 15 roughly to atmospheric pressure. Then, the door 14e is closed. The rest of the operation is conducted in the same manner as in embodiment 5.

As described in detail above, the manufacturing device of a liquid crystal display element includes a heating furnace 17; therefore, the liquid crystal cell from which water content, oxygen, and gaseous and other molecules in solvents are removed by heating can be moved to the preliminary evacuation chamber 15 without being exposed to ambient air. No water content, oxygen, or gaseous and other molecules in solvents in ambient air will be attracted any longer to the liquid crystal cell after the heating. A liquid crystal display element can be thus manufactured which does not degrade over time and which still produces a uniform display even after it is in use for a long period of time. Further, the inclusion of transport means, such as a belt conveyor, to move the liquid crystal cell holder cassette 18 enables automatic implementation of the steps including the heating and evacuating of the liquid crystal cell, the substitution of an inert gas, and the charging of liquid crystal to the liquid crystal cell.

A manufacturing device of a liquid crystal display element in accordance with the present invention, as described in detail above, may be arranged so that the depressurization device includes a preliminary evacuation device and a vacuum device lined in this order with no intervening members.

In the arrangement, the liquid crystal cell is depressurized in advance using the preliminary evacuation device; therefore, the vacuum device is always maintained in a depressurized condition. No water content, oxygen, or gaseous and other molecules in solvents enters the vacuum device which is maintained in a depressurized condition. The liquid crystal cell can be stored in the vacuum device before the injection of liquid crystal. Besides, if the liquid crystal cell is heated in advance to remove water content, oxygen, or gaseous and other molecules in solvents that initially exist in the liquid crystal cell, for example, the liquid crystal cell, heated to a high temperature, can be slowly cooled down in the vacuum device.

A manufacturing device of a liquid crystal display element in accordance with the present invention, as described in detail above, may be arranged so that the inert gas substitution device includes a pressure adjusting device and a substitution device lined in this order with no intervening members.

In the arrangement, there is provided a pressure adjusting device; therefore, the pressure difference becomes adjustable between the vacuum processing device (vacuum device) and the substitution device. Thus, the substitution device does not need to be depressurized and can be always filled with an inert gas. Accordingly, the liquid crystal cell from which water content, oxygen, and gaseous and other molecules in solvents are removed can be stored in the substitution device whose contents are replaced with an inert gas. Besides, if the liquid crystal cell is heated in advance to remove water content, oxygen, or gaseous and other molecules in solvents that initially exist in the liquid crystal cell, for example, the liquid crystal cell, heated to a high temperature, can be slowly cooled down in the substitution device.

A manufacturing device of a liquid crystal display element in accordance with the present invention, as described in detail above, may be arranged so that there is provided a heating device for heating the liquid crystal cell before the depressurization device with no intervening members.

In the arrangement, there is provided a heating device; therefore, the liquid crystal cell from which water content, oxygen, and gaseous and other molecules in solvents are removed by heating can be moved to the vacuum processing device (preliminary evacuation device) without being exposed to ambient air. No water content, oxygen, or gaseous and other molecules in solvents in ambient air will be attracted any longer to the liquid crystal cell after the heating. A manufacturing device is thus realized to manufacture a liquid crystal display element which does not degrade over time and which still produces a uniform display even after it is in use for a long period of time. Further, the devices are disposed with no intervening members, steps can be implemented without a break from the heating of the liquid crystal cell to the charging of liquid crystal to the liquid crystal cell.

EXAMPLES

The present invention will be now discussed in more detail in the following by means of examples and comparison examples. The description is illustrative, and never restrictive of the present invention.

Example 1

A liquid crystal display element was manufactured according to the foregoing manufacturing process of a liquid crystal display element. Specifically, a liquid crystal cell was manufactured according to the steps shown in the flow chart of FIG. 1, liquid crystal was then charged to the liquid crystal cell, and the "sealing" step was implemented as illustrated in FIG. 3 to manufacture the liquid crystal display element. Photolek (a product of Sekisui Chemical Co., Ltd.) was used here as the sealant 2. A commercially-available, 500 W metal halide lamp was used here as the light source 5. A 0.7 mm polyether sulfone sheet was used here as the filter 4 to remove 350 nm or shorter wavelength light from the ultraviolet light 3. The quantity of the ultraviolet light 6 was adjusted so that an ultraviolet light intensity meter with an average wavelength of 350 nm would show a measurement of 500 mJ/cm$^2$. In other words, the ultraviolet light 3 was adapted so that the quantity of the ultraviolet light 6 would equal this value and projected to cure the sealant 2. This completed the manufacture of a liquid crystal display element in accordance with the present invention.

The voltage retaining ratio (%) at a predetermined part of the liquid crystal in the manufactured liquid crystal display element measured 90%.

Comparison Example 1

A comparative liquid crystal display element was manufactured by the same steps as those in example 1, except that the air was substituted for the contents of the liquid crystal cell by feeding the air (allowing the air to leak) to the slowly cooled chamber in the vacuum oven through a conduit and thereby restoring normal pressure, in stead of implementing the "nitrogen gas substituting" step.

The voltage retaining ratio (%) at a predetermined part of the liquid crystal in the manufactured, comparative liquid crystal display element measured 70%.

Comparison Example 2

A comparative liquid crystal display element was manufactured by the same steps as those in example 1, except that the filter 4 was not used in the "sealing" step. The sealant 2 was cured, instead, by exposing it ultraviolet light (ultraviolet light 3) from which no 350 nm or shorter wavelength region was removed.

Figure 4:
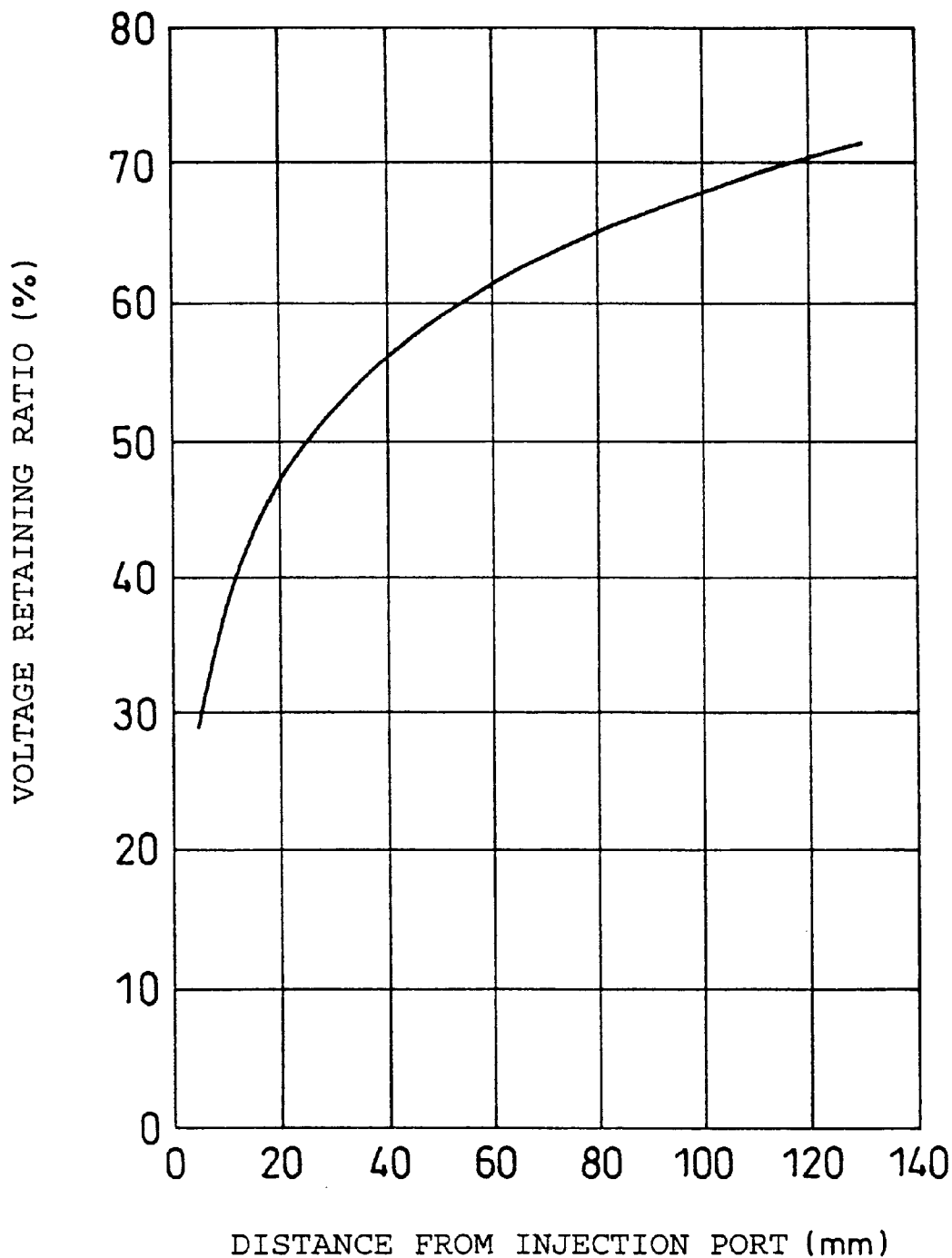
FIG. 4 is a graph showing a relationship between the distance from an injection opening and the voltage retaining ratio of a liquid crystal in a comparative liquid crystal display element.

The voltage retaining ratio (%) at a predetermined part of the liquid crystal in the manufactured, comparative liquid crystal display element measured 58%. Additionally, a relationship was evaluated between the voltage retaining ratios in the liquid crystal in the comparative liquid crystal display element and the distances from the injection opening for the liquid crystal. FIG. 4 is a graphical representation of the results, where the voltage retaining ratios in the liquid crystal in the comparative liquid crystal display element were plotted on the y-axis against the distances from the injection opening for the liquid crystal on the x-axis. It was found from the graph that the voltage retaining ratio plummeted as the distance from the injection opening for the liquid crystal decreased close to zero.

Figure 5:
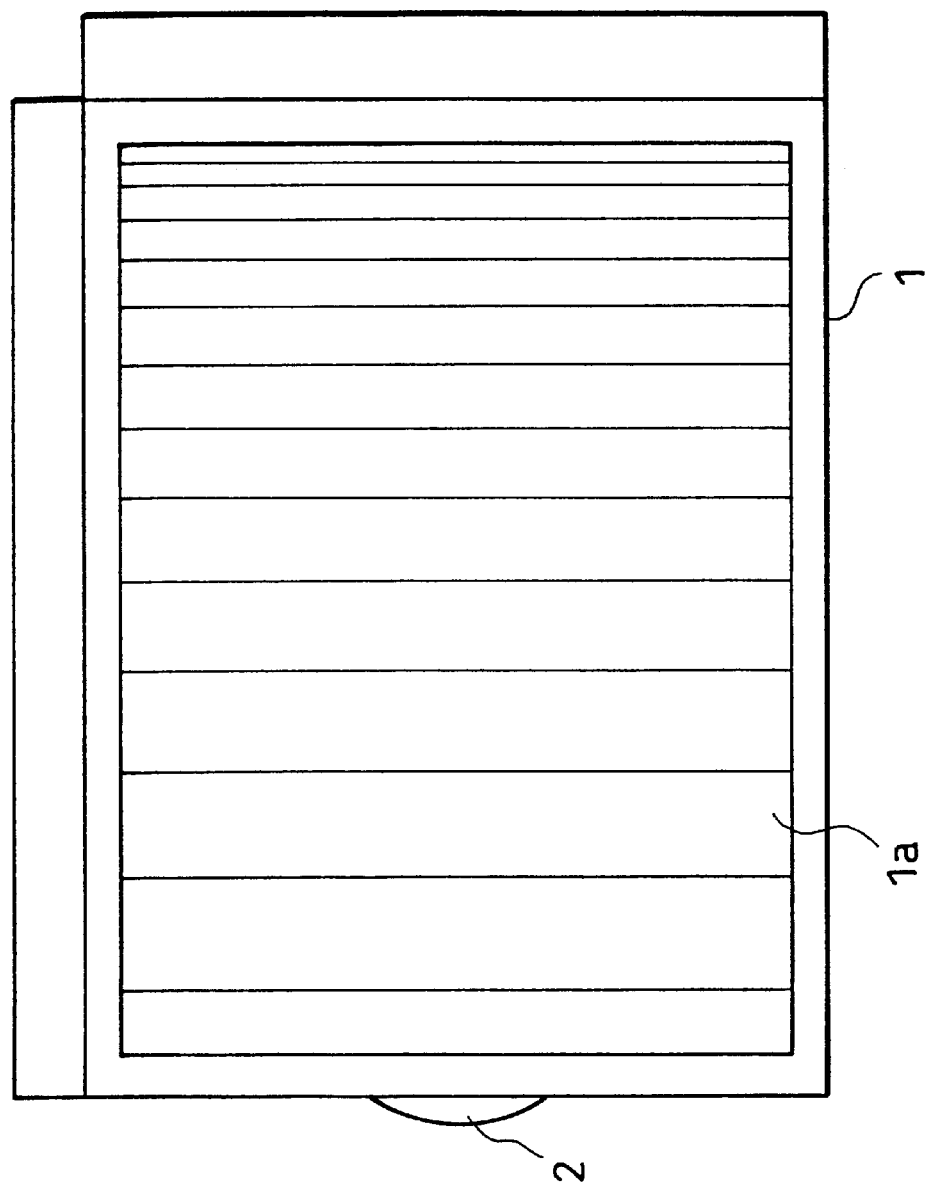
FIG. 5 is a schematic drawing showing so-called UV burns having developed in the comparative liquid crystal display element.
Figure 6:
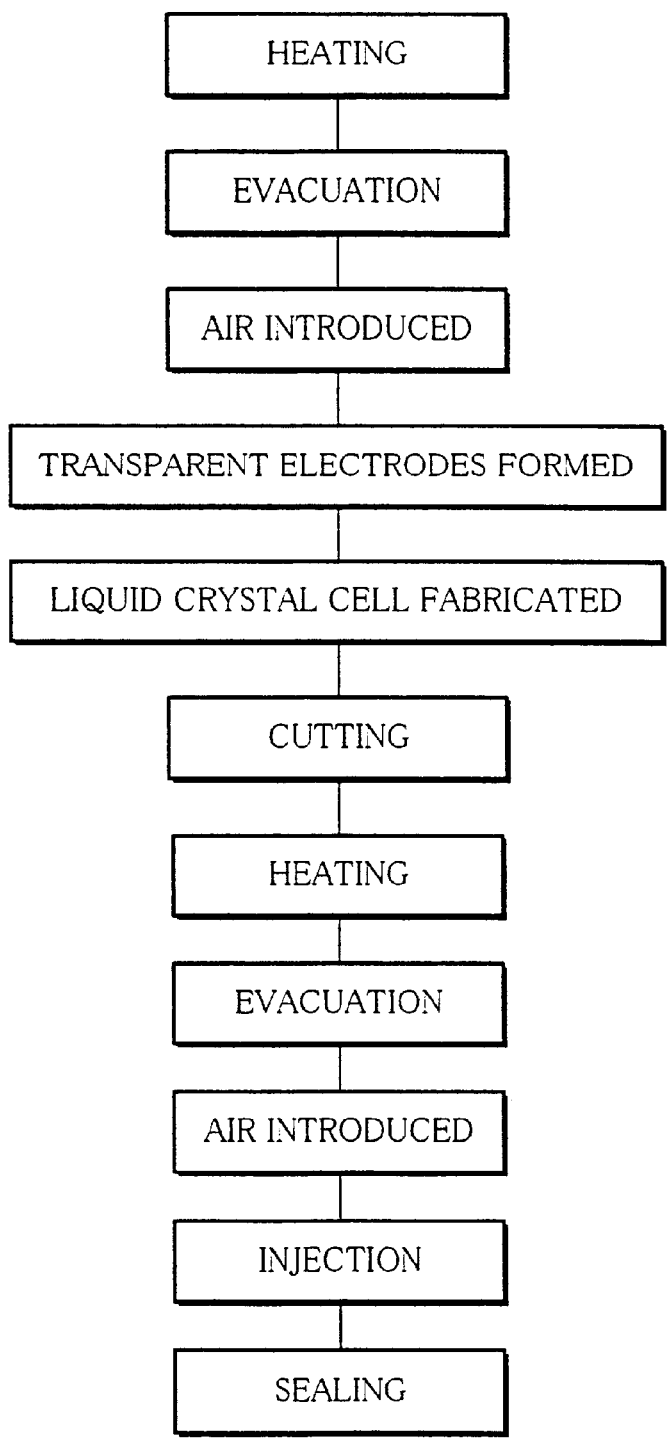
FIG. 6 is a flow chart showing manufacturing processes of a conventional liquid crystal display element.

The liquid crystal display element was then tested for a display. As shown in FIG. 5, so-called UV burns occurred in the display area 1a according to the value of the voltage retaining ratio; the lower the voltage retaining ratio, the greater the UV burns. It was thus understood that there is a correlation between the decomposition or degradation of liquid crystal and so-called UV burns.

Comparison Example 3

A comparative liquid crystal display element was manufactured by the same steps as those in example 1, except that a commercially available soda glass sheet, instead of a polyether sulfone sheet, was used as the filter 4 in the "sealing" step. The soda glass sheet absorbed 300 nm or shorter wavelength light and passed the remaining, longer-than-300 nm wavelength light. Therefore, 300 nm or shorter wavelength light was removed and did not reach the sealant 2. However, about 300 nm to about 330 nm wavelength light was not removed.

The voltage retaining ratio (%) at a predetermined part of the liquid crystal in the manufactured, comparative liquid crystal display element measured 55%. Additionally, a relationship was evaluated between the voltage retaining ratios in the liquid crystal in the comparative liquid crystal display element and the distances from the injection opening for the liquid crystal. It was found from the evaluation that the voltage retaining ratio plummeted as the distance from the injection opening for the liquid crystal decreased close to zero.

As would be clear from example 1 and comparison examples 1 to 3, the manufacturing method of a liquid crystal display element in accordance with the present invention sufficiently prevents the decomposition or degradation of the liquid crystal caused by ultraviolet light, and thereby improves the display quality of the liquid crystal display element over conventional methods.

Example 2

A liquid crystal display element was manufactured according to the foregoing manufacturing process of a liquid crystal display element. Specifically, a liquid crystal cell was manufactured according to the steps shown in the flow chart of FIG. 1, liquid crystal was then charged to the liquid crystal cell, and the "sealing" step was implemented as illustrated in FIG. 3 to manufacture the liquid crystal display element. Photolek (a product of Sekisui Chemical Co., Ltd.) was used here as the sealant 2. A commercially-available, 500 W metal halide lamp was used here as the light source 5. A 0.7 mm polyether sulfone sheet was used here as the filter 4 to project only 330 nm or greater wavelength ultraviolet light 6, of which the concentration extinction coefficient was stable near 0 as shown in FIG. 7. The quantity of the ultraviolet light 6 was adjusted so that an ultraviolet light intensity meter with an average wavelength of 350 nm would show a measurement of 500 mJ/cm$^2$. In other words, the ultraviolet light 3 was adapted so that the quantity of the ultraviolet light 6 would equal this value and projected to cure the sealant 2. This completed the manufacture of a liquid crystal display element in accordance with the present invention.

The voltage retaining ratio (%) at a predetermined part of the liquid crystal in the manufactured liquid crystal display element measured 90%.

Example 3

A liquid crystal display element was manufactured by the same steps as those in example 1, except that in the "slow cooling and evacuation" step and also in the "nitrogen gas substituting" step, about 480 minutes after the temperature of the liquid crystal cell had fallen to 60° C., the liquid crystal cell was further cooled down slowly by the introduction of a nitrogen gas (see FIG. 2).

The voltage retaining ratio (%) at a predetermined part of the liquid crystal in the manufactured liquid crystal display element measured 90%.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A manufacturing device of a liquid crystal display element, comprising:
    a depressurization device that includes an evacuation chamber for depressurizing a liquid crystal cell;
    an inert gas substitution device that includes an inert gas substitution chamber for substituting an inert gas for contents of the liquid crystal cell; and
    a liquid crystal charging device that includes a liquid crystal charging chamber for charging liquid crystal in the liquid crystal cell, the three devices being lined in this order with no intervening members.

2. The manufacturing device of a liquid crystal display element as defined in claim 1, wherein:
    the depressurization device includes a preliminary evacuation chamber and the evacuation chamber which are lined in this order with no intervening members.

3. The manufacturing device of a liquid crystal display element as defined in claim 2, wherein:
    the evacuation chamber is adapted to depressurize the liquid crystal cell to about 100 Pa.

4. The manufacturing device of a liquid crystal display element as defined in claim 1, wherein:
    the inert gas substitution device includes a pressure adjusting chamber and the inert gas substitution chamber which are lined in this order with no intervening members.

5. The manufacturing device of a liquid crystal display element as defined in claim 1, wherein:

the depressurization device includes a preliminary evacuation chamber and the evacuation chamber which are lined in this order with no intervening members; and the inert gas substitution device includes a pressure adjusting chamber and the inert gas substitution chamber which are lined in this order with no intervening members.

6. The manufacturing device of a liquid crystal display element as defined in claim 1, further comprising:

a heating device that includes a heating furnace for heating the liquid crystal cell lined before the depressurization device with no intervening members.

7. The manufacturing device of a liquid crystal display element as defined in claim 3 wherein:

the heating device is adapted to heat an interior of the liquid crystal cell at a temperature not lower than 100° C. and not higher than 150° C.

8. The manufacturing device of a liquid crystal display element as defined in claim 1, further comprising:

a transport means for transporting the liquid crystal cell.

9. The manufacturing device of a liquid crystal display element as defined in claim 8 wherein:

the transport means is a belt conveyor.

* * * * *